United States Patent
Kasamatsu et al.

(10) Patent No.: US 7,872,768 B2
(45) Date of Patent: Jan. 18, 2011

(54) IMAGE FORMING APPARATUS CAPABLE OF NOTIFYING USER OF EXIT STATUS OF DISCHARGED SHEET, IMAGE FORMING METHOD, AND PROGRAM PRODUCT

(75) Inventors: Toru Kasamatsu, Toyokawa (JP);
Kentaro Nagatani, Toyokawa (JP);
Shinichi Asai, Gamagoori (JP);
Yoshihiko Yoshizaki, Hoi-gun (JP);
Toshikazu Higashi, Hoi-gun (JP);
Yoshiaki Takano, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1403 days.

(21) Appl. No.: 11/019,449

(22) Filed: Dec. 23, 2004

(65) Prior Publication Data
US 2006/0082818 A1   Apr. 20, 2006

(30) Foreign Application Priority Data
Oct. 14, 2004   (JP)   .............................. 2004-300466

(51) Int. Cl.
*G06F 3/012* (2006.01)
*G08B 13/014* (2006.01)
*G06F 7/002* (2006.01)

(52) U.S. Cl. .................... 358/1.15; 358/1.14; 358/1.16; 358/1.13; 700/213; 700/214; 700/219; 700/222; 340/572.1; 340/568.1; 382/112

(58) Field of Classification Search .................. 358/1.1, 358/1.9, 1.12–1.18, 400–404, 488; 399/402–408; 700/213–227; 101/2; 270/52.01–52.08; 271/227, 258.01; 340/572.1, 10.1, 10.42, 340/568.1, 825.36, 825.49; 382/112; 235/385, 235/375, 382
See application file for complete search history.

(56) References Cited

U.S. PATENT DOCUMENTS 5,435,544 A * 7/1995 Mandel ....................... 271/298
6,152,629 A * 11/2000 Yoneyama et al. ........... 400/582

(Continued)

FOREIGN PATENT DOCUMENTS

JP    11-341212    12/1999

(Continued)

OTHER PUBLICATIONS

Official Action issued by the Japanese Patent Office in priority application No. 2004-300466 on Sep. 26, 2006, and English translation thereof.

Primary Examiner—Twyler L Haskins
Assistant Examiner—Chad Dickerson
(74) Attorney, Agent, or Firm—Buchanan Ingersoll & Rooney PC

(57) ABSTRACT

An image forming apparatus that warns that a JOB fails to be pulled out is provided. Warning processes executed by a CPU of a printer that is one example of the image forming apparatus includes the steps of determining whether a JOB list is updated, setting a job counter JB_S_CTA for checking JOB at an initial value "1" and setting an upper limit counter JB_S_CTB at an upper limit value when the JOB list is updated, executing a failure-to-pull-out warning process if JOBs counted by JB_S_CTA belong to the same client, and incrementing the JB_S_CTA by "1".

19 Claims, 41 Drawing Sheets

U.S. PATENT DOCUMENTS

| | | | |
|---|---|---|---|
| 6,827,279 B2 * | 12/2004 | Teraura | 235/492 |
| 6,952,278 B2 | 10/2005 | Miyahara et al. | |
| 7,424,974 B2 * | 9/2008 | Hull et al. | 235/385 |
| 2002/0163666 A1 * | 11/2002 | Iwata et al. | 358/1.15 |
| 2004/0041696 A1 * | 3/2004 | Hull et al. | 340/10.42 |
| 2004/0041707 A1 * | 3/2004 | Hull et al. | 340/568.1 |

FOREIGN PATENT DOCUMENTS

| | | |
|---|---|---|
| JP | 2000-029644 A | 1/2000 |
| JP | 2003145896 | 5/2003 |
| JP | 2004-223966 | 8/2004 |
| JP | 2005-035145 A | 2/2005 |

\* cited by examiner

| RECEPTION DATE F500 | JOB No. F510 | CLIENT ID F520 | OUTPUT DOCUMENT NAME F530 | NETWORK ADDRESS F540 |
|---|---|---|---|---|
| 20040715 13:00 | 1 | A | document1.doc | 123.45.67.89 |
| 20040715 13:15 | 2 | B | documentB.doc | 123.45.67.80 |
| 20040715 14:00 | 3 | C | documentC.doc | 123.45.67.70 |
| 20040715 14:30 | 4 | A | document2.doc | 123.45.67.89 |
| ... | ... | ... | ... | ... |

| | 1 | 2 | 3 | 4 | 5 | 6 | 7 | 8 | 9 | ... | ... | N |
|---|---|---|---|---|---|---|---|---|---|---|---|---|
| F1950 | 1 | 2 | 3 | 4 | 5 | 6 | 7 | 8 | 9 | ... | ... | N |
| F1960 | A | null | null | null | null | null | null | null | null | null | null | null |
| F1970 | 1 | null | null | null | null | null | null | null | null | null | null | null |
| F1980 | 1 | null | null | null | null | null | null | null | null | null | null | null |
| F1990 | 1 | null | null | null | null | null | null | null | null | null | null | null |

(B)

| | 1 | 2 | 3 | 4 | 5 | 6 | 7 | 8 | 9 | ... | ... | N |
|---|---|---|---|---|---|---|---|---|---|---|---|---|
| F1950 | 1 | 2 | 3 | 4 | 5 | 6 | 7 | 8 | 9 | ... | ... | N |
| F1960 | A | A | null | null | null | null | null | null | null | null | null | null |
| F1970 | 1 | 1 | null | null | null | null | null | null | null | null | null | null |
| F1980 | 2 | 2 | null | null | null | null | null | null | null | null | null | null |
| F1990 | 1 | 2 | null | null | null | null | null | null | null | null | null | null |

(C)

| | 1 | 2 | 3 | 4 | 5 | 6 | 7 | 8 | 9 | ... | ... | N |
|---|---|---|---|---|---|---|---|---|---|---|---|---|
| F1950 | 1 | 2 | 3 | 4 | 5 | 6 | 7 | 8 | 9 | ... | ... | N |
| F1960 | A | A | A | null | null | null | null | null | null | null | null | null |
| F1970 | 1 | 1 | 1 | null | null | null | null | null | null | null | null | null |
| F1980 | 3 | 3 | 3 | null | null | null | null | null | null | null | null | null |
| F1990 | 1 | 2 | 3 | null | null | null | null | null | null | null | null | null |

(D)

| | 1 | 2 | 3 | 4 | 5 | 6 | 7 | 8 | 9 | ... | ... | N |
|---|---|---|---|---|---|---|---|---|---|---|---|---|
| F1950 | 1 | 2 | 3 | 4 | 5 | 6 | 7 | 8 | 9 | ... | ... | N |
| F1960 | A | A | A | B | null | null | null | null | null | null | null | null |
| F1970 | 1 | 1 | 1 | 4 | null | null | null | null | null | null | null | null |
| F1980 | 3 | 3 | 3 | 4 | null | null | null | null | null | null | null | null |
| F1990 | 1 | 2 | 3 | 4 | null | null | null | null | null | null | null | null |

(E)

| | 1 | 2 | 3 | 4 | 5 | 6 | 7 | 8 | 9 | ... | ... | N |
|---|---|---|---|---|---|---|---|---|---|---|---|---|
| F1950 | 1 | 2 | 3 | 4 | 5 | 6 | 7 | 8 | 9 | ... | ... | N |
| F1960 | A | A | A | B | B | null | null | null | null | null | null | null |
| F1970 | 1 | 1 | 1 | 4 | 4 | null | null | null | null | null | null | null |
| F1980 | 3 | 3 | 3 | 5 | 5 | null | null | null | null | null | null | null |
| F1990 | 1 | 2 | 3 | 4 | 5 | null | null | null | null | null | null | null |

(F)

| | 1 | 2 | 3 | 4 | 5 | 6 | 7 | 8 | 9 | ... | ... | N |
|---|---|---|---|---|---|---|---|---|---|---|---|---|
| F1950 | 1 | 2 | 3 | 4 | 5 | 6 | 7 | 8 | 9 | ... | ... | N |
| F1960 | A | A | A | B | B | C | C | C | C | null | null | null |
| F1970 | 1 | 1 | 1 | 4 | 4 | 6 | 6 | 6 | 6 | null | null | null |
| F1980 | 3 | 3 | 3 | 5 | 5 | 9 | 9 | 9 | 9 | null | null | null |
| F1990 | 1 | 2 | 3 | 4 | 5 | 6 | 7 | 8 | 9 | null | null | null |

| | 1 | 2 | 3 | 4 | 5 | 6 | 7 | 8 | 9 | ... | ... | N |
|---|---|---|---|---|---|---|---|---|---|---|---|---|
| F2150 | 1 | 2 | 3 | 4 | 5 | 6 | 7 | 8 | 9 | ... | ... | N |
| F2160 | A | A | C | null | null | null | null | null | null | null | null | null |
| F2170 | null | null | null | null | null | null | null | null | null | null | null | null |
| F2180 | null | null | null | null | null | null | null | null | null | null | null | null |
| F2190 | 1 | 3 | 6 | null | null | null | null | null | null | null | null | null |

| | 1 | 2 | 3 | 4 | 5 | 6 | 7 | 8 | 9 | ... | ... | N |
|---|---|---|---|---|---|---|---|---|---|---|---|---|
| F1950 | 1 | 2 | 3 | 4 | 5 | 6 | 7 | 8 | 9 | ... | ... | N |
| F1960 | A | A | A | null | null | C | C | C | C | null | null | null |
| F1970 | 1 | 1 | 1 | null | null | 6 | 6 | 6 | 6 | null | null | null |
| F1980 | 3 | 3 | 3 | null | null | 9 | 9 | 9 | 9 | null | null | null |
| F1990 | 1 | 2 | 3 | null | null | 6 | 7 | 8 | 9 | null | null | null |

(B)

| 1 | 2 | 3 | 4 | 5 | 6 | 7 | 8 | 9 | ... | ... | N |
|---|---|---|---|---|---|---|---|---|---|---|---|
| A | A | A | C | C | C | C | null | null | null | null | null |
| 1 | 1 | 1 | 6 | 6 | 6 | 6 | null | null | null | null | null |
| 1 | 3 | 3 | 9 | 9 | 9 | 9 | null | null | null | null | null |
| 1 | 2 | 3 | 6 | 7 | 8 | 9 | null | null | null | null | null |

| | | | | | | |
|---|---|---|---|---|---|---|
| F1950 | 1 | 2 | 3 | 4 | 5 | 6 |
| F1960 | A | A | B | B | C | C |
| F1970 | 1 | 1 | 3 | 3 | 5 | 5 |
| F1980 | 2 | 2 | 4 | 4 | 6 | 6 |
| F1990 | 1 | 2 | 3 | 4 | 5 | 6 |

| 7 | 8 | 9 | 10 | 11 | 12 |
|---|---|---|---|---|---|
| D | D | E | E | A | A |
| 7 | 7 | 9 | 9 | 11 | 11 |
| 8 | 8 | 10 | 10 | 12 | 12 |
| 7 | 8 | 9 | 10 | 11 | 12 |

| 13 | 14 | 15 | 16 | 17 | 18 |
|---|---|---|---|---|---|
| G | G | H | H | I | I |
| 13 | 13 | 15 | 15 | 17 | 17 |
| 14 | 14 | 16 | 16 | 18 | 18 |
| 13 | 14 | 15 | 16 | 17 | 18 |

| 19 | 20 |
|---|---|
| A | A |
| 19 | 19 |
| 20 | 20 |
| 19 | 20 |

FIG.24

| | | | | | | |
|---|---|---|---|---|---|---|
| F2150 | 1 | 2 | 3 | 4 | 5 | 6 |
| F2160 | A | A | B | B | C | C |
| F2170 | 1 | 1 | 3 | 3 | 5 | 5 |
| F2180 | 2 | 2 | 4 | 4 | 6 | 6 |
| F2190 | 1 | 2 | 3 | 4 | 5 | 6 |

| | | | | | |
|---|---|---|---|---|---|
| 7 | 8 | 9 | 10 | 11 | 12 |
| D | D | E | E | A | A |
| 7 | 7 | 9 | 9 | 11 | 11 |
| 8 | 8 | 10 | 10 | 12 | 12 |
| 7 | 8 | 9 | 10 | 11 | 12 |

| | | | | | |
|---|---|---|---|---|---|
| 13 | 14 | 15 | 16 | 17 | 18 |
| G | G | H | H | I | I |
| 13 | 13 | 15 | 15 | 17 | 17 |
| 14 | 14 | 16 | 16 | 18 | 18 |
| 13 | 14 | 15 | 16 | 17 | 18 |

PULLED-OUT JOB

| | |
|---|---|
| message00.audio<br>(♪ DISCHARGED SHEET FOR JOB X IS STILL LEFT ON SHEET EXIT TRAY.) | ─F3010 |
| message01.audio<br>(♪ DISCHARGED SHEETS FOR JOB X AND JOB Y ARE STILL LEFT ON SHEET EXIT TRAY.) | ─F3020 |
| . . . | |
| message10.audio<br>(♪ JOB X IS ERRONEOUSLY PULLED OUT.) | ─F3030 |
| message11.audio<br>(♪ JOB X AND JOB Y ARE ERRONEOUSLY PULLED OUT.) | ─F3040 |
| . . . | |
| message20.audio<br>(♪ PART OF JOB X IS ERRONEOUSLY PULLED OUT.) | ─F3050 |
| message21.audio<br>(♪ PART OF JOB X AND JOB Y ARE ERRONEOUSLY PULLED OUT.) | ─F3060 |
| . . . | |

FIG.36

| | | | | | | |
|---|---|---|---|---|---|---|
| F1950 | 1 | 2 | 3 | 4 | 5 | 6 |
| F1960 | A | A | A | A | C | C |
| F1970 | 1 | 1 | 1 | 1 | 5 | 5 |
| F1980 | 4 | 4 | 4 | 4 | 6 | 6 |
| F1990 | 1 | 2 | 3 | 4 | 5 | 6 |

| 7 | 8 | 9 | 10 | 11 | 12 |
|---|---|---|---|---|---|
| I | I | I | I | I | I |
| 7 | 7 | 7 | 7 | 7 | 7 |
| 18 | 18 | 18 | 18 | 18 | 18 |
| 7 | 8 | 9 | 10 | 11 | 12 |

| 13 | 14 | 15 | 16 | 17 | 18 |
|---|---|---|---|---|---|
| I | I | I | I | I | I |
| 7 | 7 | 7 | 7 | 7 | 7 |
| 18 | 18 | 18 | 18 | 18 | 18 |
| 13 | 14 | 15 | 16 | 17 | 18 |

| 19 | 20 |
|---|---|
| A | A |
| 19 | 19 |
| 20 | 20 |
| 19 | 20 |

| | 1 | 2 | 3 | 4 | 5 | 6 |
|---|---|---|---|---|---|---|
| F2150 | | | | | | |
| F2160 | null | null | null | null | C | C |
| F2170 | null | null | null | null | 5 | 5 |
| F2180 | null | null | null | null | 6 | 6 |
| F2190 | null | null | null | null | 5 | 6 |

| 7 | 8 | 9 | 10 | 11 | 12 |
|---|---|---|---|---|---|
| null | null | null | null | null | null |
| null | null | null | null | null | null |
| null | null | null | null | null | null |
| null | null | null | null | null | null |

| 13 | 14 | 15 | 16 | 17 | 18 |
|---|---|---|---|---|---|
| null | null | null | null | null | null |
| null | null | null | null | null | null |
| null | null | null | null | null | null |
| null | null | null | null | 1null | null |

| 19 | 20 |
|---|---|
| null | null |
| null | null |
| null | null |
| null | null |

| NUMBER | CLIENT NAME | TOTAL NUMBER OF PULLED-OUT JOBS | TOTAL NUMBER OF PULLED-OUT SHEETS |
|---|---|---|---|
| 1 | A | 2 JOBS | 6 pages |
| 2 | I | 1 JOB | 12 pages |

FIG.43

| | | | | | | |
|---|---|---|---|---|---|---|
| F1950 | 1 | 2 | 3 | 4 | 5 | 6 |
| F1960 | A | A | B | B | C | C |
| F1970 | 1 | 1 | 3 | 3 | 5 | 5 |
| F1980 | 2 | 2 | 4 | 4 | 6 | 6 |
| F1990 | 1 | 2 | 3 | 4 | 5 | 6 |

| | | | | | |
|---|---|---|---|---|---|
| 7 | 8 | 9 | 10 | 11 | 12 |
| D | D | E | E | F | F |
| 7 | 7 | 9 | 9 | 11 | 11 |
| 8 | 8 | 10 | 10 | 12 | 12 |
| 7 | 8 | 9 | 10 | 11 | 12 |

| | | | | | |
|---|---|---|---|---|---|
| 13 | 14 | 15 | 16 | 17 | 18 |
| G | G | H | H | I | I |
| 13 | 13 | 15 | 15 | 17 | 17 |
| 14 | 14 | 16 | 16 | 18 | 18 |
| 13 | 14 | 15 | 16 | 17 | 18 |

| | |
|---|---|
| 19 | 20 |
| J | J |
| 19 | 19 |
| 20 | 20 |
| 19 | 20 |

| | | | | | | |
|---|---|---|---|---|---|---|
| F2150 | 1 | 2 | 3 | 4 | MISSING JOB | 5 |
| F2160 | A | A | B | B | | C |
| F2170 | 1 | 1 | 3 | 3 | | 5 |
| F2180 | 2 | 2 | 4 | 4 | | 6 |
| F2190 | 1 | 2 | 3 | 4 | | 6 |

| 6 | 7 | MISSING JOB | 8 | 9 | 10 |
|---|---|---|---|---|---|
| D | D | | E | F | F |
| 7 | 7 | | 9 | 11 | 11 |
| 8 | 8 | | 10 | 12 | 12 |
| 7 | 8 | | 10 | 11 | 12 |

| MISSING JOB | 11 | 12 | 13 | 14 | 15 |
|---|---|---|---|---|---|
| | G | H | H | I | I |
| | 13 | 15 | 15 | 17 | 17 |
| | 14 | 16 | 16 | 18 | 18 |
| | 14 | 15 | 16 | 17 | 18 |

| 16 | 17 |
|---|---|
| J | J |
| 19 | 19 |
| 20 | 20 |
| 19 | 20 |

| | | | | | | |
|---|---|---|---|---|---|---|
| F2150 | 1 | 2 | 3 | 4 | 5 | 6 |
| F2160 | A | A | B | B | C | C |
| F2170 | 1 | 1 | 3 | 3 | 5 | 5 |
| F2180 | 2 | 2 | 4 | 4 | 6 | 6 |
| F2190 | 1 | 2 | 3 | 4 | 5 | 6 |

| 7 | 8 | 9 | 10 | 11 | 12 |
|---|---|---|---|---|---|
| D | D | E | E | A | A |
| 7 | 7 | 9 | 9 | 11 | 11 |
| 8 | 8 | 10 | 10 | 12 | 12 |
| 7 | 8 | 9 | 10 | 11 | 12 |

| 13 | 14 | 15 | 16 | 17 | 18 |
|---|---|---|---|---|---|
| G | G | H | H | I | I |
| 13 | 13 | 15 | 15 | 17 | 17 |
| 14 | 14 | 16 | 16 | 18 | 18 |
| 13 | 14 | 15 | 16 | 17 | 18 |

| 19 | 20 |
|---|---|
| A | A |
| 19 | 19 |
| 20 | 20 |
| 19 | 20 |

| CLIENT NAME (F5210) | NUMBER OF PAGES (F5220) |
|---|---|
| A | 2 |
| B | 2 |
| C | 2 |
| D | 2 |
| E | 2 |
| A | 2 |
| G | 2 |
| H | 2 |
| I | 2 |
| A | 2 |

FIG.55

| CLIENT NAME | NUMBER OF PAGES | NUMBER OF JOBS |
|---|---|---|
| A | 6 | 3 |
| B | 2 | 1 |
| C | 2 | 1 |
| D | 2 | 1 |
| E | 2 | 1 |
| F | 2 | 1 |
| G | 2 | 1 |
| H | 2 | 1 |
| I | 2 | 1 |

IMAGE FORMING APPARATUS CAPABLE OF NOTIFYING USER OF EXIT STATUS OF DISCHARGED SHEET, IMAGE FORMING METHOD, AND PROGRAM PRODUCT

This application is based on Japanese Patent Application No. 2004-300466 filed with the Japan Patent Office on Oct. 14, 2004, the entire content of which is hereby incorporated by reference.

BACKGROUND OF THE INVENTION

1. Field of the Invention

The present invention relates to an image forming apparatus. More particularly, the present invention relates to an image forming apparatus capable of notifying a user of an exit status of a discharged sheet, an image forming method, and a program product for controlling the image forming apparatus.

2. Description of the Related Art

A printer or the other image forming apparatus connected to a network accepts inputs of a print command by a user of each of client apparatuses that constitute the network from each client apparatus. The image forming apparatus outputs an image to a print sheet based on input data according to the command. When a plurality of print commands are transmitted to the image forming apparatus, printed sheets are output according to the respective commands and, then, are sequentially accumulated in a sheet exit tray of the image forming apparatus. For this reason, the user of each client apparatus is often incapable of easily grasping where the sheet corresponding to the user's command is present. Particularly, if the sheet is output with its print surface turned down, the user needs to turn up the print surface and determines whether the sheet corresponds to the user's print command. Further, the user often erroneously pulls out a sheet printed for the other user.

To solve these problems, Japanese Laid-Open Patent Publication No. 2003-145896 discloses an image forming apparatus capable of checking an exit status of a discharged sheet without turning out the sheet. This apparatus includes an image forming unit that forms an image on each recording medium, an exit unit to which the recording medium on which the image is formed by the image forming unit is discharged, and a display control unit that displays image information on each of a plurality of recording mediums so that a superimposition order of the respective recording mediums discharged to one exit unit is recognizable when the recording mediums are discharged to the exit unit.

According to the image forming apparatus disclosed in the Japanese Laid-Open Patent Publication No. 2003-145896, the image information is displayed on the display unit. A user can, therefore, confirm where the sheet corresponding to the user's print command is present while referring to the information.

In the meantime, the user of each client apparatus sometimes fails to pull out the sheet corresponding to the user's command and discharged to the exit tray of the image forming apparatus or erroneously pulls out the sheet of the other user discharged to the exit tray.

With the technique disclosed in the Japanese Laid-Open Patent Publication No. 2003-145896, however, even if the sheet printed for the other user is erroneously pulled out, none of the users can recognize that the sheet is erroneously pulled out until the user who pulls out the sheet check a content of the sheet.

SUMMARY OF THE INVENTION

The present invention has been achieved to solve the aforementioned problems. It is an object of the present invention to provide an image forming apparatus capable of announcing an exit status of discharged sheets. It is another object of the present invention to provide an image forming apparatus capable of announcing that a sheet is pulled out. It is still another object of the present invention to provide an image forming apparatus capable of displaying a list of the number of sheets made to associate with a client that issues a sheet discharge command.

It is yet another object of the present invention to provide an image forming method capable of announcing the exit status of discharged sheets. It is yet another object of the present invention to provide a program product for controlling an image forming apparatus to announce the exit status of discharged sheets.

According to one aspect of the present invention, there is provided an image forming apparatus including: an image forming unit that forms an image on a sheet; a storage unit that stores identification data for identifying the sheet and a client name for identifying a client corresponding to the sheet while making the identification data and the client name associate with each other; and a writing unit that writes the client name and the identification data in a tag allocated to the sheet. The tag includes a communication unit that transmits and receives information, and an information storage unit that stores information. The image forming apparatus further includes: a reading unit that reads information in the tag allocated to each sheet; a generating unit that generates notification information for announcing an exit status of the each sheet based on the information read by the reading unit, and on the information stored in the storage unit; and a notification unit that announces the exit status based on the notification information.

The image forming apparatus according to the present invention announces an exit status of a discharged recording medium based on a print command. Therefore, a sender of the print command can know, for example, that the recording medium fails to be pulled out or that the recording medium is erroneously pulled out without viewing a content of the recording medium.

Further, the image forming apparatus according to the present invention notifies an information processing apparatus that outputs the print command of the exit status of the recording medium discharged based on the print command. Therefore, the sender of the print command can know, for example, that the recording medium fails to be pulled out or that the recording medium is erroneously pulled out without viewing the content of the recording medium.

According to another aspect of the present invention, there is provided an image forming method including: an image forming step of forming an image on a sheet; a storage step of storing identification data for identifying the sheet and a client name for identifying a client corresponding to the sheet while making the identification data and the client name associate with each other; and a writing step of writing the client name and the identification data in a tag allocated to the sheet. The tag includes a communication unit that transmits and receives information, and an information storage unit that stores information. The image forming method further includes: a reading step of reading information in the tag allocated to each sheet; a generating step of generating notification information for annoucing an exit status of the each sheet based on the information read at the reading step, and on the information stored at the storage step; and a notification step of announcing the exit status based on the notification information.

According to still aspect of the present invention, there is provided a program product for controlling an image forming apparatus. This program products causes the image forming apparatus to execute: an image forming step of forming an image on a sheet; a storage step of storing identification data for identifying the sheet and a client name for identifying a client corresponding to the sheet while making the identification data and the client name associate with each other; and a writing step of writing the client name and the identification data in a tag allocated to the sheet. The tag includes a communication unit that transmits and receives information, and an information storage unit that stores information. The program product further causes the image forming apparatus to execute: a reading step of reading information in the tag allocated to each sheet; a generating step of generating notification information for announcing an exit status of the each sheet based on the information read at the reading step, and on the information stored at the storage step; and a notification step of announcing the exit status based on the notification information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 19 to 24 show data structures for the printer according to the first embodiment of the present invention;

FIG. 30 shows a data structure for a printer according to a first modification of the first embodiment of the present invention;

FIGS. 36 to 38 show a data structure for a printer according to a second embodiment of the present invention;

FIGS. 43 and 44 show data structures for a printer according to a third embodiment of the present invention;

FIGS. 51 and 52 show data structures for a printer according to the fourth embodiment of the present invention;

FIG. 55 shows a data structure for a printer according to a modification of the fourth embodiment of the present invention.

DESCRIPTION OF THE PREFERRED EMBODIMENTS

Figure 1:
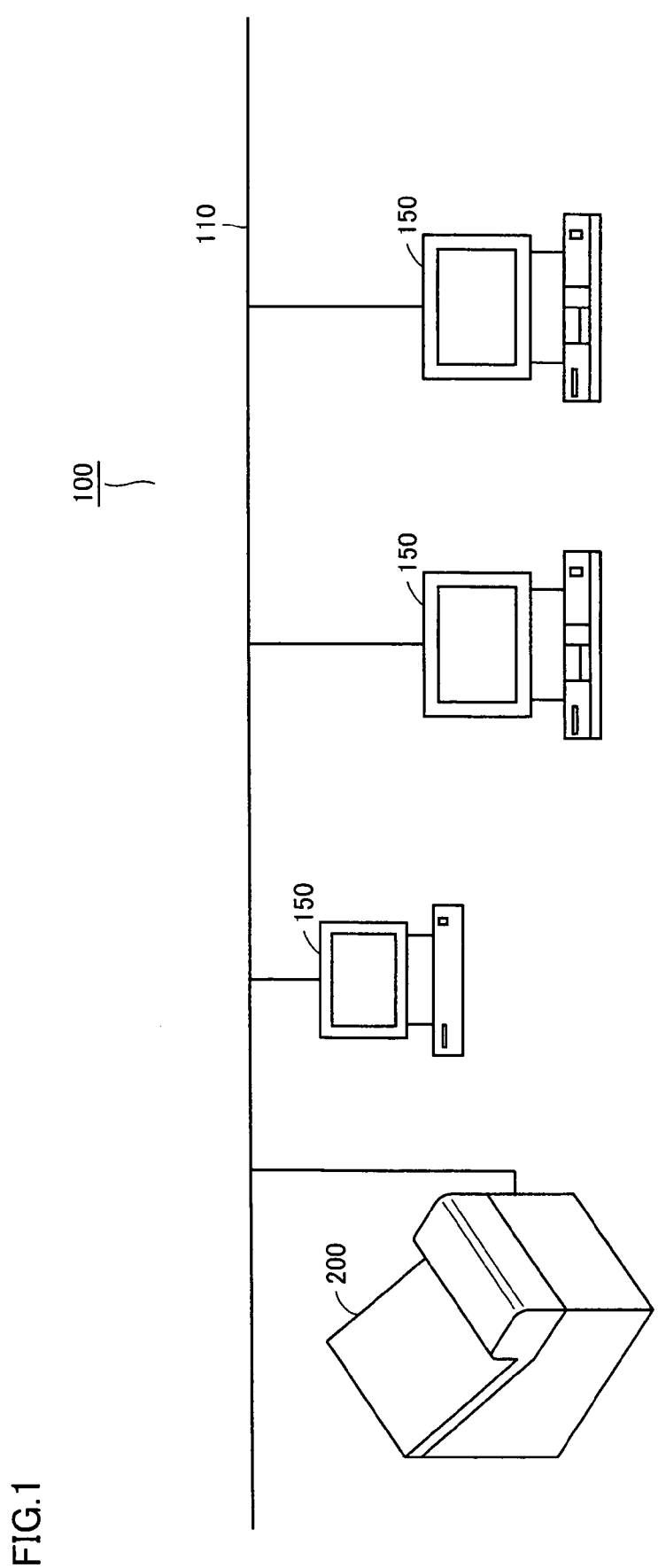
FIG. 1 shows a system configuration of an office system including a printer according to a first embodiment of the present invention.

Preferred embodiments of the present invention will be described hereinafter with reference to the accompanying drawings. In the following description, the same components are denoted by the same reference numerals, respectively, and are equal in name and function. In addition, the same processes are denoted by the same step numbers, respectively. They will not be, therefore, described repeatedly.

First Embodiment

Referring to FIG. 1, an office system 100 according to a first embodiment of the present invention will be described. FIG. 1 shows a network configuration of office system 100 including a printer 200.

Office system 100 includes printer 200 and at least one user computer 150 each of which is connected to a network 110. In FIG. 1, three computers 150 are connected to network 110. However, the number of computer 150 may be one or more. Printer 200 is one example of the image forming apparatus according to the present invention. However, the image forming apparatus is not limited to printer 200. The image forming apparatus may be, for example, a facsimile transmitter-receiver or a multifunction peripheral (MFP).

Figure 2:
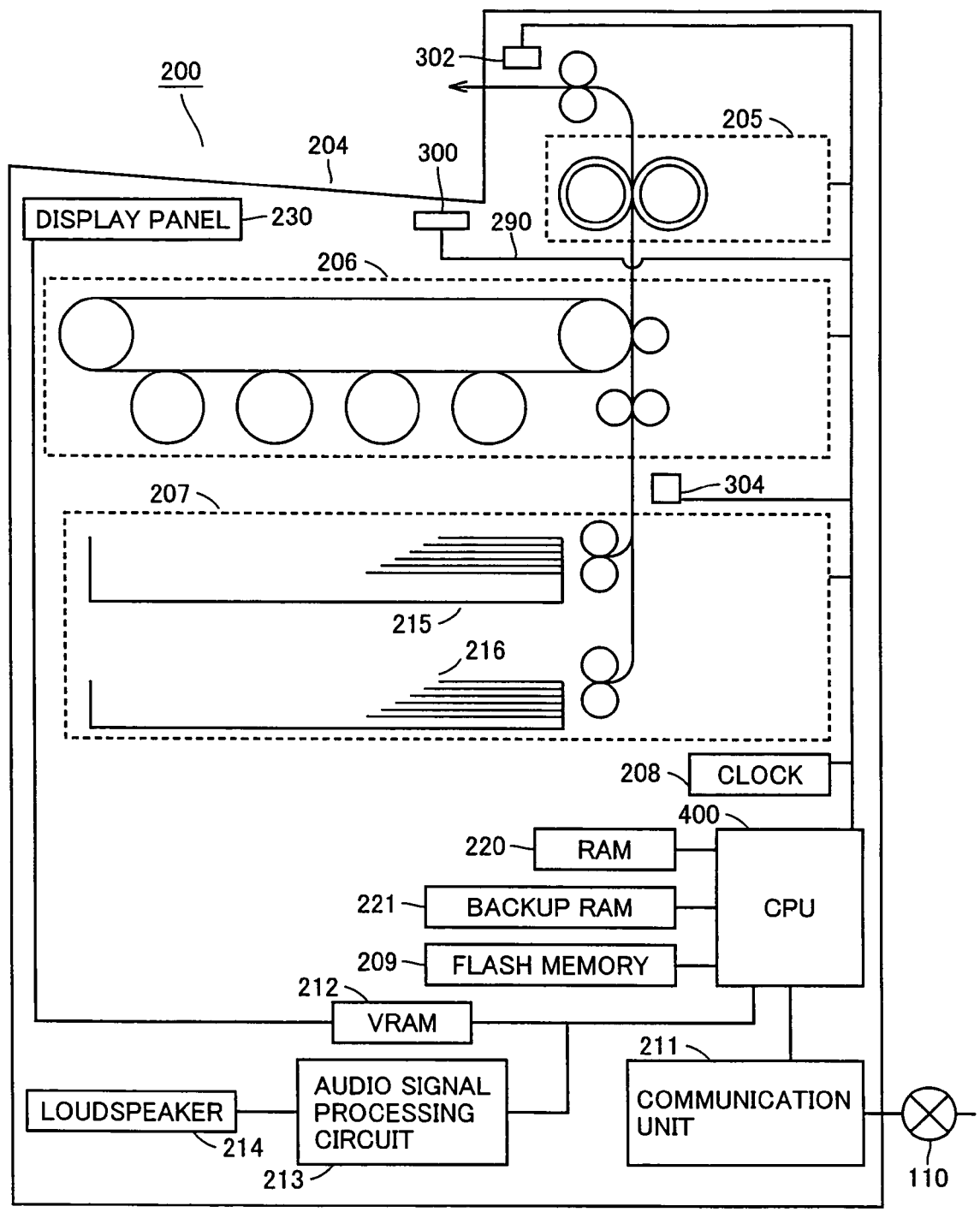
FIG. 2 is a block diagram that shows a hardware configuration of the printer according to the first embodiment of the present invention.

Referring to FIG. 2, a configuration of printer 200 according to the first embodiment will be described. FIG. 2 is a block diagram that shows a hardware configuration of printer 200.

Printer 200 includes a communication unit 211 connected to network 110, a central processing unit (CPU) 400, a fixer 205, an imaging unit 206, a sheet feed unit 207, a clock 208, a flash memory 209, a random-access memory (RAM) 220, a backup RAM 221, a video RAM (VRAM) 212, an audio signal processing circuit 213, a loudspeaker 214, a display panel 230, a sheet exit tray 204, an integrated circuit (IC) tag reader 300, and IC tag writers 302 and 304. Sheet feed unit 207 includes sheet feed cassettes 215 and 216.

Communication unit 211 receives a signal input through network 110, and outputs the input signal to CPU 400. Communication unit 211 also outputs a signal output from CPU 400 to network 110.

Sheet feed unit 207 pulls out a sheet from one of sheet feed cassettes 215 and 216 based on a command from CPU 400, and supplies the sheet to a predetermined roller. Imaging unit 206 executes imaging processes indicated based on a command from CPU 400. Fixer 205 fixes an image formed on the sheet onto the sheet based on a command from CPU 400 by executing a predetermined process.

Clock 208 measures a time at printer 200 and outputs time data to CPU 400. This time data includes, for example, a cycle in which IC tag reader 300 communicates with a sheet on exit tray 204.

Flash memory 209 stores a program and data for causing printer 200 to execute a predetermined operation. RAM 220 temporarily stores data input through network 110, or data generated by processes performed by CPU 400. This data includes a print command output from each computer 150 and data for displaying a predetermined image on display panel 230, to be described later, or data output through communication unit 211. VRAM 212 temporarily stores the data for displaying the image on display panel 230. RAM 220 and VRAM 212 may be constituted by one RAM.

Backup RAM 221 stores data input from an outside of printer 200 in preparation for power cutoff. The data stored in backup RAM 221 includes, for example, the print command output from each computer 150. By using this data, even if a power of printer 200 is cut off, the print command or the like a processes corresponding to which is not completed can be returned.

Voice signal processing circuit 213 executes predetermined conversion processes, thereby converting the data output from CPU 400 into an audio signal. When this signal is output, loudspeaker 214 sounds according to this data.

CPU 400 executes processes for controlling the operation of printer 200 based on the program stored in flash memory 209 in advance. Based on a signal output according to this process, printer 200 executes a sheet feed process, an imaging process, a fixing process, a sheet exit process or the like. CPU 400 stores data in a predetermined area of VRAM 212. This area is the one referred to by a control driver (not shown) for display panel 230. If CPU 400 stores the data in the area, therefore, an image (e.g., a predetermined message) according to the data is displayed. This process will be described later in detail.

Each of IC tag writers 302 and 304 outputs a predetermined radio signal, thereby communicating with a recording medium that includes a data communication function and a data storage function. The recording medium means a medium on which an image can be formed, e.g., a sheet. Although the sheet will be described as one example of the recording medium, the recording medium is not limited to the sheet. The recording medium may be a medium on which an image can be formed, e.g., a thin film. IC tag reader 300 outputs a predetermined radio signal to the sheet piled up on exit tray 204, thereby communicating with the sheet. IC tag reader 300 receives a signal transmitted from the sheet, reads data in the signal, and writes the data into a predetermined area of RAM 220. This communication process will be described later in detail.

Figure 3:
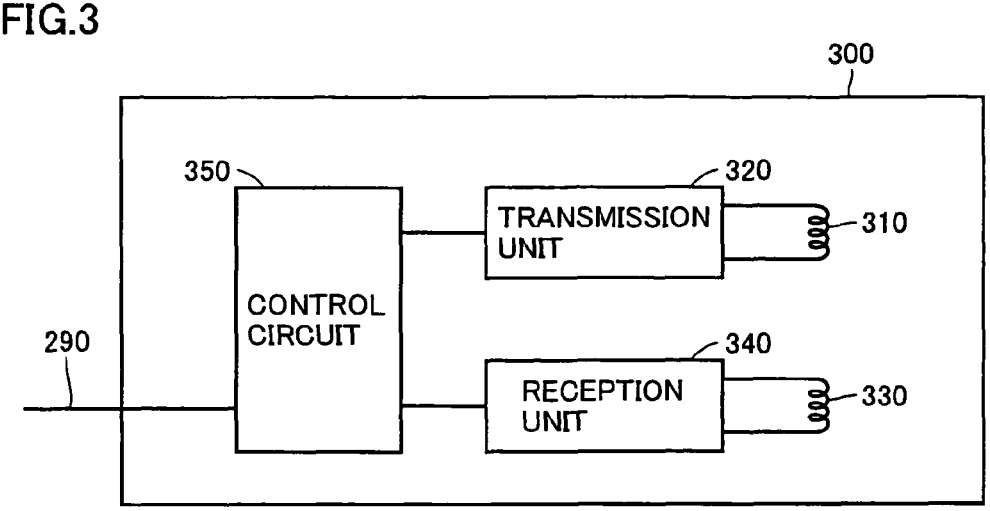
FIG. 3 is a block diagram that shows a hardware configuration of an IC tag reader included in the printer shown in FIG. 2.

Referring to FIG. 3, IC tag reader 300 included in printer 200 will be described. FIG. 3 is a block diagram that shows a hardware configuration of IC tag reader 300.

IC tag reader 300 includes a transmission unit 320 that includes a transmission antenna coil 310, a reception unit 340 that includes a reception antenna coil 330, and a control circuit 350. Control circuit 350 is connected to CPU 400 through a signal line 290.

If IC tag reader 300 communicates with an IC tag, to be described later, then control circuit 350 controls the transmission unit 320 to modulate a carrier signal, and to transmit the modulated carrier signal from transmission antenna coil 310 as a power radio wave signal. Thereafter, control circuit 350 controls transmission unit 320 to modulate a to-be-transmitted data signal so as to be superimposed on the power radio wave signal, and to transmit the modulated data signal from transmission antenna coil 310. When IC tag reader 300 receives a radio wave signal from the IC tag, this signal is received by reception antenna coil 330, demodulated by reception unit 340, and discriminated as data.

Figure 4:
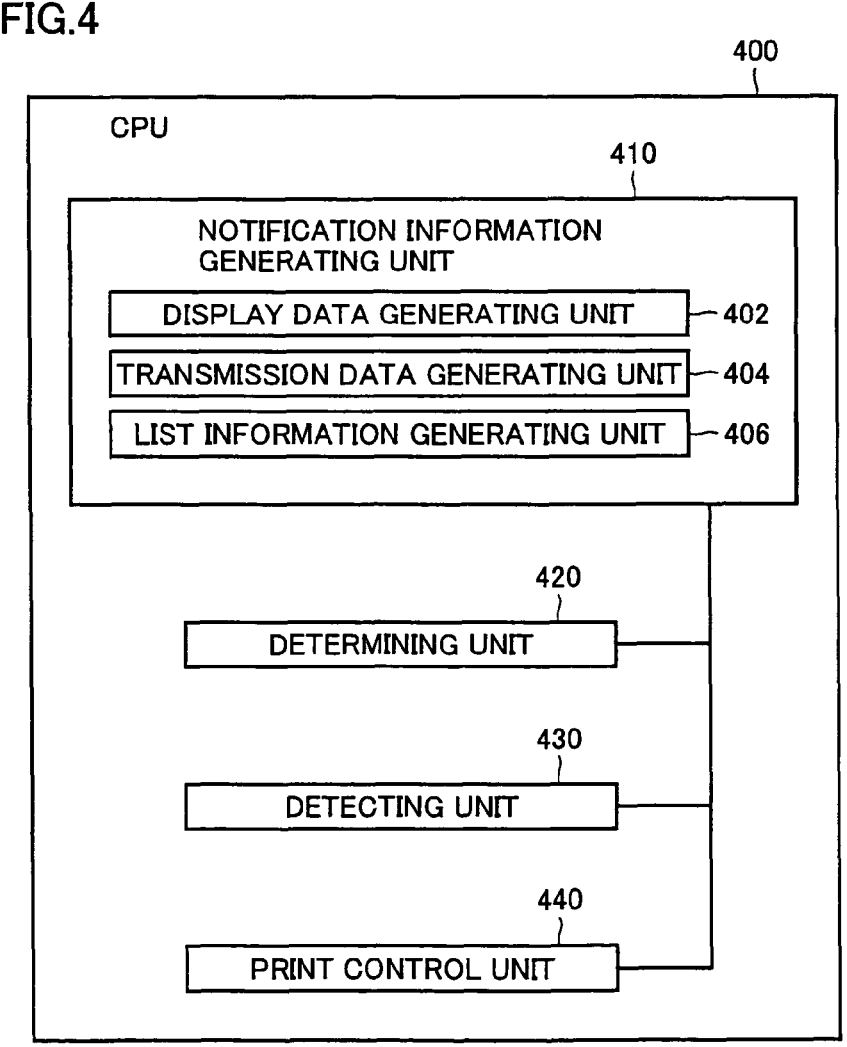
FIG. 4 is a block diagram that shows a configuration of functions realized by a CPU included in the printer shown in FIG. 2.

Referring to FIG. 4, CPU 400 included in printer 200 according to this embodiment will be described. FIG. 4 is a block diagram that shows a configuration of functions realized by CPU 400. The functions are realized by executing a program stored in flash memory 209.

CPU 400 includes a notification information generating unit 410, a determining unit 420, a detecting unit 430, and a print control unit 440. Notification information generating unit 410 includes a display data generating unit 402, a transmitted data generating unit 404, and a list information generating unit 406.

Notification information generating unit 410 generates data for notifying a user of an exit status of a sheet discharged to exit tray 204 based on the data stored in the predetermined area in RAM 220. Specifically, display data generating unit 402 generates display data for displaying a message for notifying the user of the exit status of the sheet piled up on exit tray 204, on display panel 230. The display data includes data for warning the user that a specific sheet is pulled out. Transmitted data generating unit 404 generates data to be transmitted to each computer 150 connected to network 110. This data includes a transmission header and a data body. A data structure of this data will be described later. List information generating unit 406 generates data for displaying a list of sheets piled up on exit tray 204. Notification information generating unit 410 also generates audio data for outputting a predetermined sound to loudspeaker 214 based on the audio data stored in flash memory 209 in advance. An example of this sound includes a sound for notifying the user that a discharged sheet is pulled out and a sound for notifying the user that a sheet is left in exit tray 204.

Determining unit 420 determines whether a sheet is pulled out based on the print command stored in RAM 220 and on the data received by IC tag reader 300 from the sheet piled up on exit tray 204. In another aspect, determining unit 420 determines which of the sheets corresponding to a plurality of print commands, respectively, is pulled out and which is left based on these items of data. In still another aspect, determining unit 420 determines which user pulls out an erroneous sheet.

Detecting unit 430 detects whether a door (not shown) of printer 200 is opened based on a signal from an opening-closing switch (not shown) provided at the door of printer 200. Detecting unit 430 detects that the power of printer 200 is changed from an OFF state to an ON state based on a signal (not shown) from a power switch.

Print control unit 440 controls the print processes performed by printer 200 based on the print command received by communication unit 211. Namely, print control unit 440 outputs a signal for pulling out a sheet from sheet feed cassette 215 or 216 in response to the print command. Print control unit 440 outputs a command for forming an indicated image to imaging unit 206. Print control unit 440 further outputs a command for causing fixer 205 to fix the formed image. Since the print processes performed by printer 200 are well known, it will not be described herein.

Figure 5:
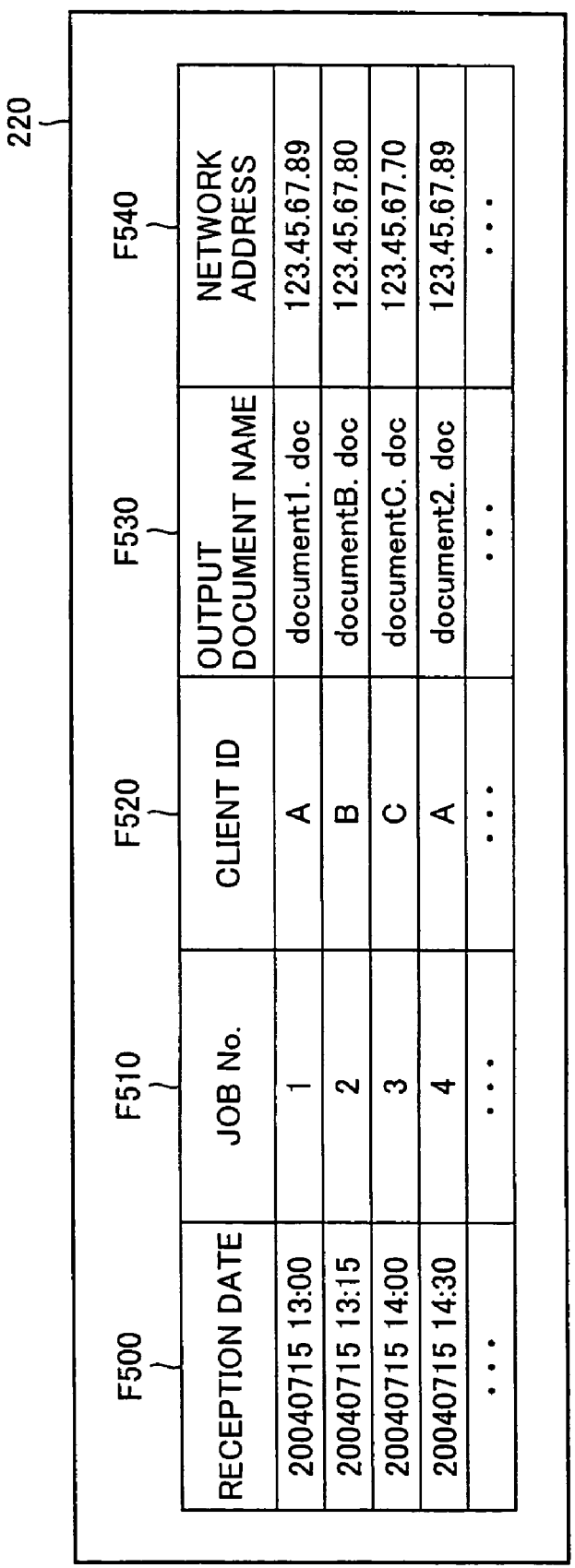
FIG. 5 shows a data structure for the printer shown in FIG. 2.

Referring to FIG. 5, a data structure for printer 200 according to this embodiment will be described. FIG. 5 conceptually shows one example of items of data stored in RAM 220 of printer 200. These items of data are those that represent print commands input to printer 200 through communication unit 211. These items of data are written to RAM 220 one by one by CPU 400 in response to each input print command.

In RAM 220, a date when each print command is received is stored in an area F500. Number specific to and allocated to respective print commands are sequentially given as "JOB No.", and stored in an area F510. Information for identifying a sender of each print command, that is, a client identification (ID) is stored in an area F520. A name of an output document which is indicated to be printed is stored in an area F530. The output document name is made to associate with print data to be output. A content of the output document which is indicated to be printed is formed on a sheet based on this print data. Data for identifying a location of each computer 150 connected to network 110 is stored in an area F540. This data is, for example, a network address. Printer 200 can thus transmit data for notifying the user that the discharged sheet is pulled out, data for notifying the user of a discharge result or the like to the computer that includes the network address.

Figure 6:
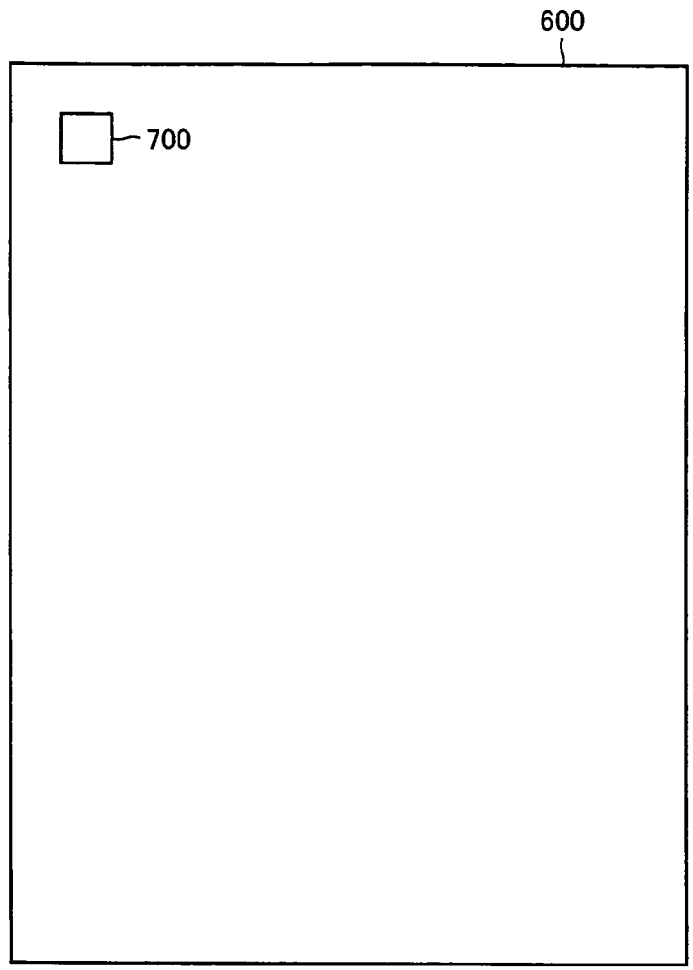
FIG. 6 shows a sheet including an IC tag.

Referring to FIG. 6, sheet 600 used in printer 200 according to this embodiment will be described. FIG. 6 shows a configuration of the sheet allocated an IC tag. The IC tag means herein a tag for identifying the sheet. An example of the tag is not limited to the IC tag. It suffices that the tag includes a communication function for transmitting and receiving information and a storage function for storing information.

Sheet 600 includes an IC tag 700. A location of IC tag 700 is a preset location, for example, outside of a printable range. In the example of FIG. 6, IC tag 700 is at an upper left location. However, IC tag 700 may be at a location other than the upper left location. In the example of FIG. 6, IC tag 700 is arranged on one side of sheet 600. However, IC tag 700 may be arranged on each side of sheet 600. Further, IC tag 700 may be allocated to sheet 600 in advance or allocated to sheet 600 when sheet 600 is discharged. In the latter case, even if the sheet is abandoned because of paper jam, IC tag 700 is not abandoned. It is, therefore, possible to suppress a cost of IC tag 700.

Figure 7:
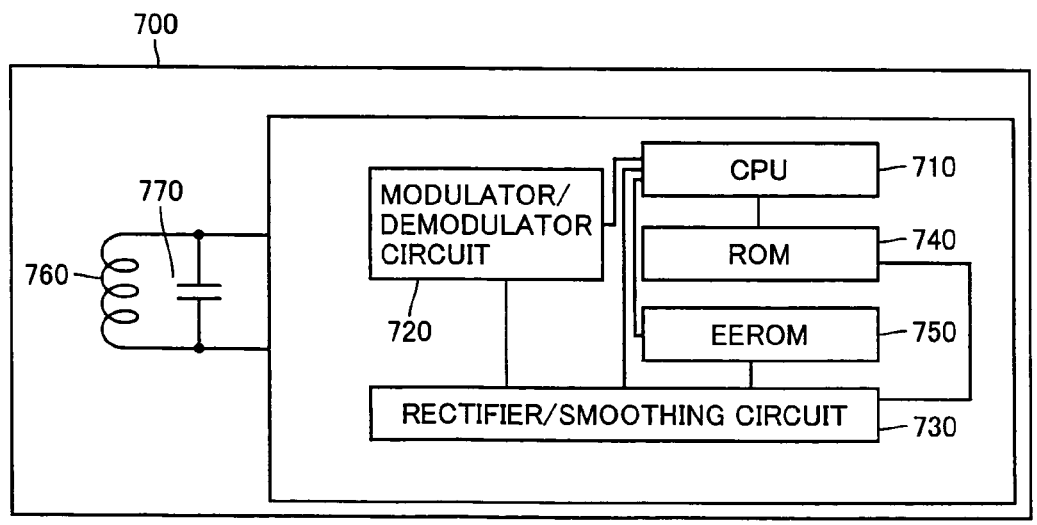
FIG. 7 is a block diagram that shows a hardware configuration of the IC tag shown in FIG. 6.

Referring to FIG. 7, IC tag 700 allocated to sheet 600 will be described. FIG. 7 shows a hardware configuration of IC tag 700.

IC tag 700 includes a CPU 710, a modulator/demodulator circuit 720, a rectifier/smoothing circuit 730, a read-only memory (ROM) 740, an electrically erasable ROM (EEPROM) 750, an antenna 760, and a resonant capacitor 770. Antenna 760 is connected in parallel to resonant capacitor 770, and antenna 760 and resonant capacitor 770 constitute a resonant circuit. When a power radio wave signal at a predetermined high frequency is transmitted from IC tag reader 300 to IC tag 700, antenna 760 receives the signal. The received signal is supplied to rectifier/smoothing circuit 730. Rectifier/smoothing circuit 730 converts the signal into a certain voltage. Rectifier/smoothing circuit 730 supplies a power to CPU 710, modulator/demodulator circuit 720, ROM 740, and EEPROM 750. Information transmitted from IC tag reader 300 or IC tag writer 302 or 304 is transmitted while being superimposed on the power radio wave signal. The modulator/demodulator circuit 720 demodulates the signal and outputs the demodulated signal to CPU 710.

CPU 710 writes data included in the received signal to EEPROM 750. Further, CPU 710 reads the data stored in EEPROM 750 and outputs the data to modulator/demodulator circuit 720. Modulator/demodulator circuit 720 demodulates the data and transmits the demodulated data as a radio wave signal through antenna 760.

Figure 8:
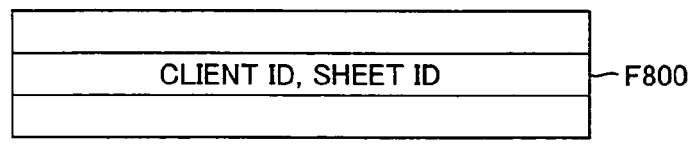
FIG. 8 shows a data structure of the IC tag shown in FIG. 6.

Referring to FIG. 8, a data structure of IC tag 700 will be described. FIG. 8 conceptually shows one example of the data stored in EEPROM 750 of IC tag 700.

When IC tag 700 receives a signal, a data signal included in the signal is input to CPU 710 by modulator/demodulator circuit 720. CPU 710 stores the signal in a predetermined area F800 in EEPROM 750. The data stored at this time is, for example, a client ID and a sheet ID. The data may be other than the client ID and the sheet ID. For example, a discharge time, a job number made to associate with the sheet ID or the other data may be stored in predetermined area F800.

When IC tag 700 receives a data transmission command from tag reader 300 included in printer 200, the data stored in area F800 is read by CPU 710 and transmitted to tag reader again through antenna 760. The client ID means herein data for identifying computer 150 that outputs the print command. The sheet ID means information for identifying each sheet printed in response to the command.

Figure 9:
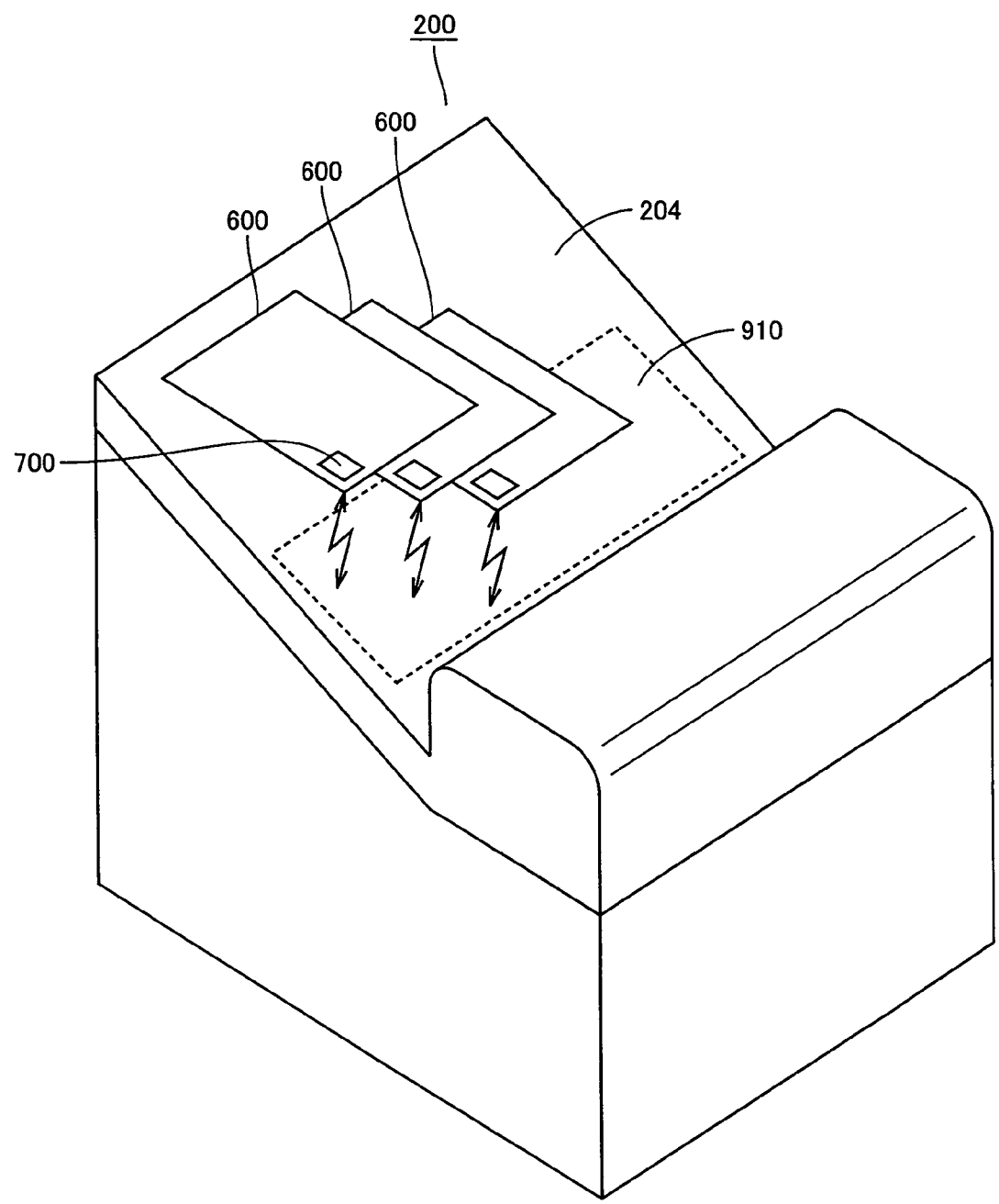
FIG. 9 illustrates a multi-access of the printer according to the first embodiment of the present invention.

Referring to FIG. 9, a multi-access of printer 200 according to this embodiment will be described. FIG. 9 shows a state where a plurality of sheets 600 are discharged to exit tray 204 of printer 200. The multi-access means that printer 200 holds a predetermined information communication with a plurality of targets by one communication.

Printer 200 prints out respective sheets 600 based on the print command and sequentially discharges sheets 600 to exit tray 204. Respective sheets 600 are, therefore, accumulated in exit tray 204. Printer 200 includes a predetermined communicable area 910. This communicable area 910 means a range in which IC tag reader 300 can communicate with IC tag 700 allocated to each sheet 600. This range is, for example, a range slightly larger than a magnitude of each sheet 600. If IC tag 700 allocated to each sheet 600 is within communicable area 910, IC tag reader 300 can communicate with plural sheets 600 by one communication. Printer 200 can thereby acquire all items of data stored in plural sheets 600 piled up on exit tray 204. A communication time is, for example, 100 milliseconds. However, the communication time is not limited to 100 milliseconds and may be shorter or longer than 100 milliseconds.

The multi-access is realized by, for example, an anti-collision technique. Since this technique is well known, it will not be described herein in detail.

Figure 10:
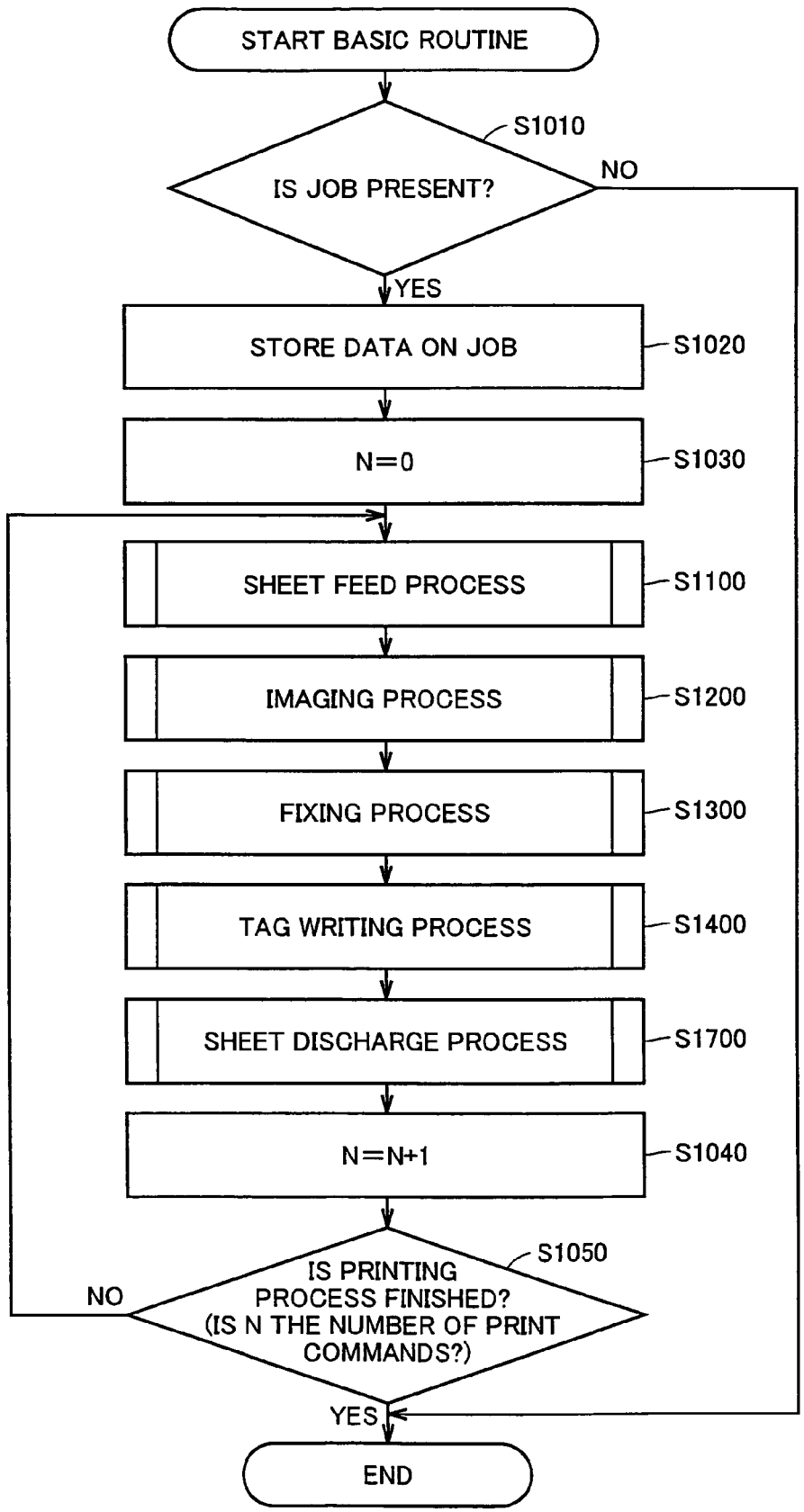
FIGS. 10 to 18 are flowcharts that show a procedure for processes executed by the printer according to the first embodiment of the present invention.

Referring to FIGS. 10 to 18, a control structure of printer 200 according to this embodiment will be described. FIG. 10 is a flowchart that shows a procedure for basic routine processes executed by CPU 400 of printer 200. This processing is realized by causing CPU 400 to execute the program stored in flash memory 209.

In step S1010, CPU 400 determines whether a job (hereinafter "JOB") is present. The JOB means one print command output from one client computer 150, to-be-printed data included in the print command or an operation executed based on the print command. If CPU 400 determines that JOB is present ("YES" in step S1010), the processing advances to step S1020. Otherwise ("NO" in step S1010), the processes are finished. In step S1020, CPU 400 stores the data that constitutes JOB in the predetermined area in RAM 220. In step S1030, CPU 400 initializes a number-of-prints counter N to "0".

In step S1100, CPU 440 executes a sheet feed process to be described later. When this process is executed, sheet 600 allocated IC tag 700 is supplied from one of sheet feed cassettes 215 and 216. In step S1200, CPU 400 executes an imaging process, to be described later, based on the data included in JOB. When this process is executed, a predetermined image is formed on sheet 600. In step S1300, CPU 400 executes a fixing process, to be described later. When this process is executed, the image formed on sheet 600 is fixed onto sheet 600.

In step S1400, CPU 400 executes tag writing processes, to be described later. When these processes are executed, the client ID and the sheet ID included in JOB are written to IC tag 700 allocated to sheet 600. In step S1700, CPU 400 executes sheet discharge processes to be described later. When these processes are executed, sheet 600 which is printed and on which tag information is written based on JOB is output onto exit tray 204. In step S1040, CPU 400 increments a number-of-prints counter N by "1". In step S1050, CPU 400 determines whether the print process is finished. This determination is made by checking whether number-of-prints counter N is equal to the number of print commands. When CPU 400 determines that the print processing is finished ("YES" in step S1050), the processes are finished. Otherwise ("NO" in step S1050), the processing is returned to step S1100.

Figure 11:
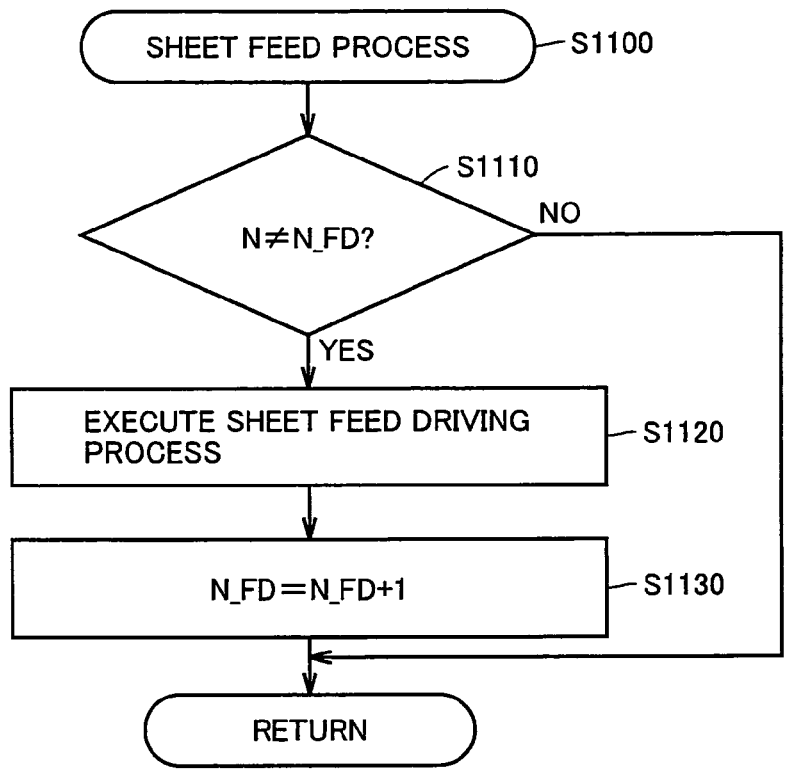

FIG. 11 is a flowchart that shows a procedure for the sheet feed processes executed by CPU 400.

In step S1110, CPU 400 determines whether the number of fed sheets N_FD is different from the number of prints N. If CPU 400 determines that N_FD is different from N ("YES" in step S1110), the processing advances to step S1120. Otherwise ("NO" in step S1110), the processes are finished and returned to the basic routine processing.

In step S1120, CPU 400 executes a predetermined sheet feed driving process. When this process is executed, the sheets included in the sheet feed cassette 215 or 216 are pulled out one by one. The sheets are fed to a sheet feed roller (not shown) for a later process. In step S1130, CPU 400 increments a number-of-fed-sheets counter N_FD by "1". The processing is then returned to the basic routine processing. Since the sheet feed process is well known, it will not be described herein.

Figure 12:
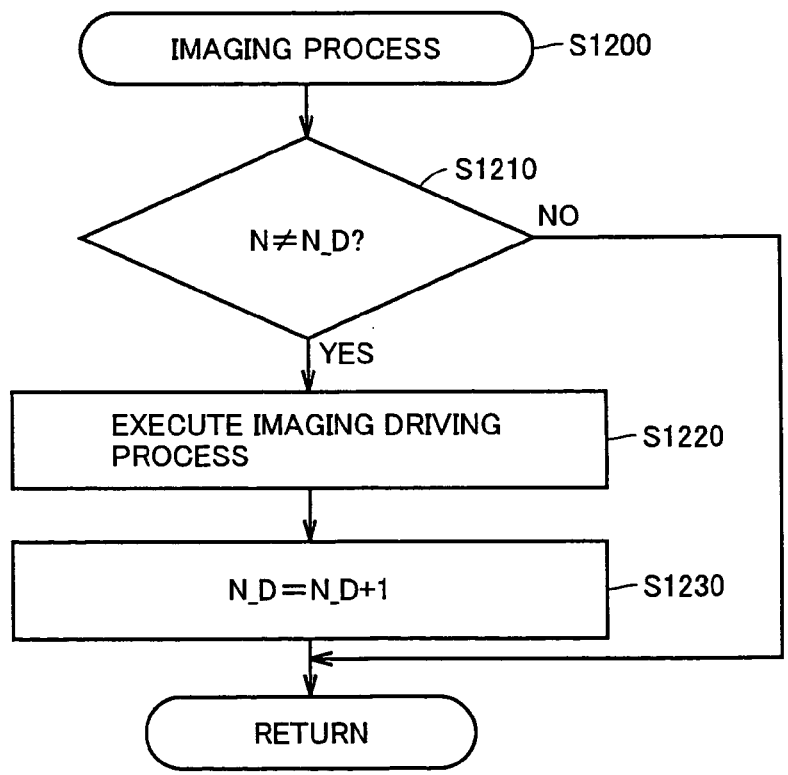

FIG. 12 is a flowchart that shows a procedure for imaging processes executed by CPU 400.

In step S1210, CPU 400 determines whether the number of imaging target sheets N_D is different from the number of prints N. If CPU 400 determines that N_D is different from N ("YES" in step S1210), the processing advances to step S1220. Otherwise ("NO" in step S1210), the processes are finished and returned to the basic routine processing.

In step S1220, CPU 400 executes a preset imaging driving process. When this process is executed, an image according to the print command is formed on a printed area of each sheet. Namely, a document, a graphic or the other image is formed on the sheet. In step S1230, CPU 400 increments a number-of-imaging-target-sheets counter by "1". Thereafter, the processing is returned to the basic routine processing. Since the imaging process is well known, it will not be described herein.

Figure 13:
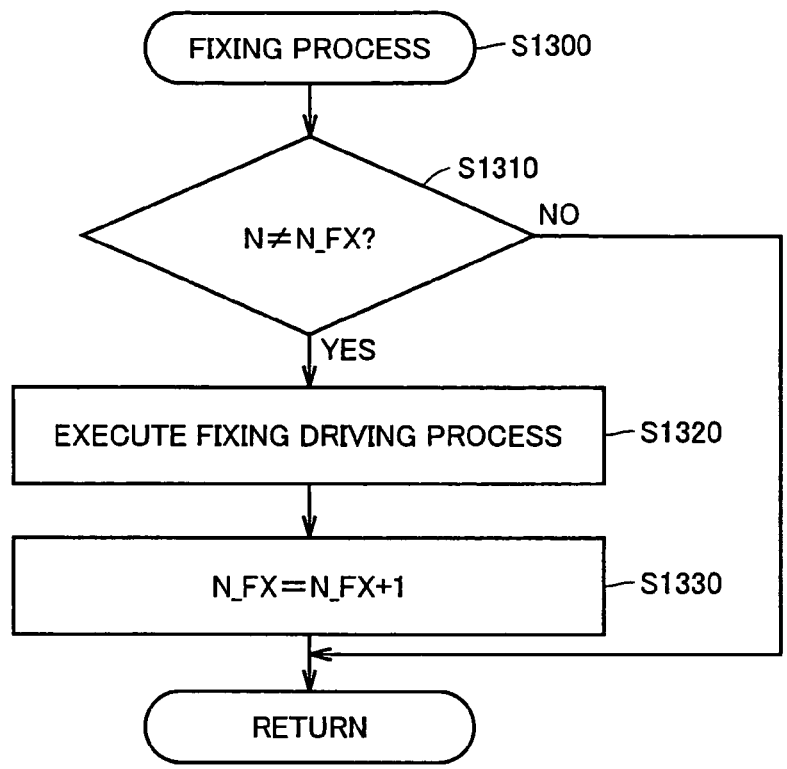

FIG. 13 is a flowchart that shows a procedure for fixing processes executed by CPU 400.

In step S1310, CPU 400 determines whether the number of prints N is different from the number of fixing target sheets N_FX. If CPU 400 determines that N is different from N_FX ("YES" at S1310), the processing advances to step S1320. Otherwise ("NO" in step S1310), the processing is finished and returned to the basic routine processing.

In step S1320, CPU 400 executes a preset fixing driving process. When this process is executed, a toner transferred onto each sheet is fixed onto the sheet. In step S1330, CPU 400 increments a number-of-fixing-target-sheets counter N_FX by "1". Thereafter, the processing is returned to the basic routine processing. Since the fixing process is well known, it will not be described herein.

Figure 14:
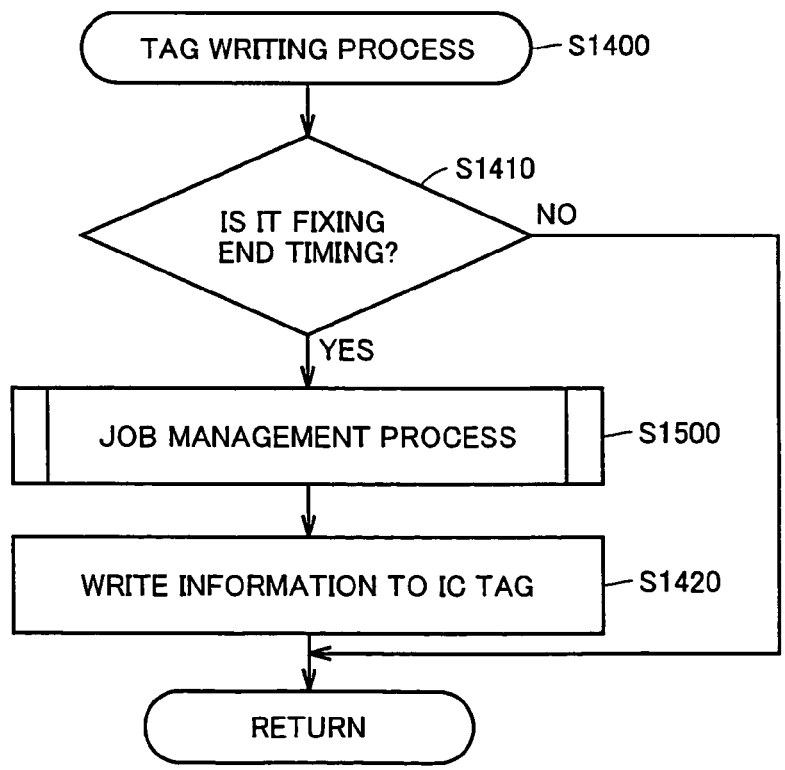

FIG. 14 is a flowchart that shows a procedure for tag writing processes executed by CPU 400 using IC tag writer 302. These processes are executed when the print process, particularly the fixing process is finished in printer 200. The tag writing process is not necessarily executed only at this timing. For example, the process may be executed after the sheet feed process. In the latter case, the tag writing process is executed by IC tag writer 304.

In step S1410, control circuit 350 of IC tag writer 302 determines whether it is a fixing end timing based on a signal from CPU 400. If CPU 400 determines that it is the fixing end timing ("YES" in step S1410), the processing advances to step S1500. Otherwise ("NO" in step S1410), the process is finished and returned to the basic routine processing.

In step S1500, CPU 400 executes JOB management processes to be described later. When this process is executed, information stored in RAM 220, i.e., client information on JOB for each fed sheet is read. In addition, the sheet ID allocated to each sheet is updated. In step S1420, CPU 400 writes information to IC tag 700 through control circuit 350. Namely, transmission unit 320 of IC tag writer 302 transmits a signal that includes the client ID and the sheet ID to sheet 600 completed with the fixing process. Thereafter, the processing is returned to the basic routine processing.

Figure 15:
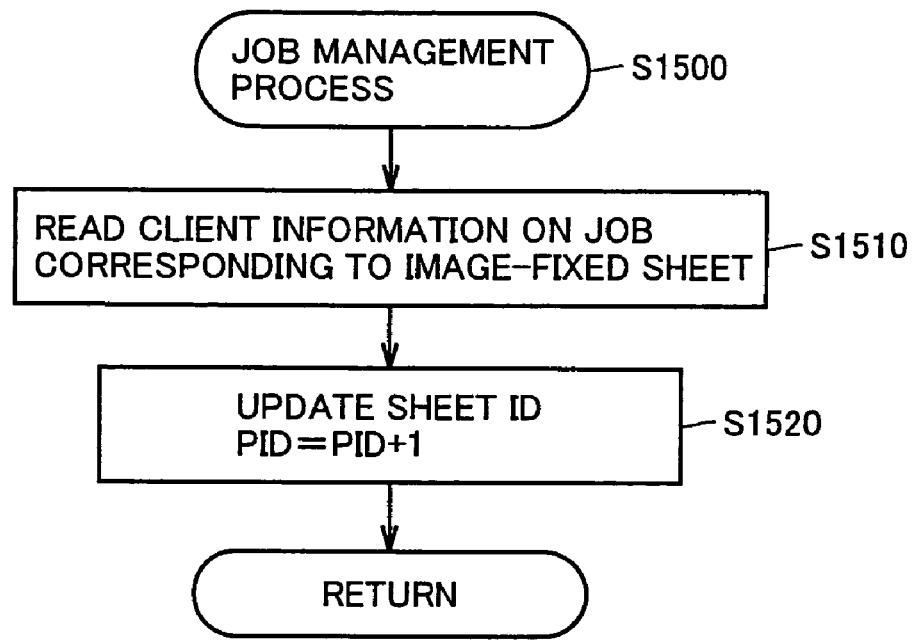

FIG. 15 is a flowchart that shows a procedure for the JOB management processes executed by CPU 400.

In step S1510, CPU 400 reads the client information on JOB corresponding to sheet 600 completed with the fixing process from the predetermined area in RAM 220. In step S1520, CPU 400 updates the sheet ID (hereinafter, "PID"). In this embodiment, PID is incremented by "1". Thereafter, the processing is returned to the basic routine processing.

Figure 16:
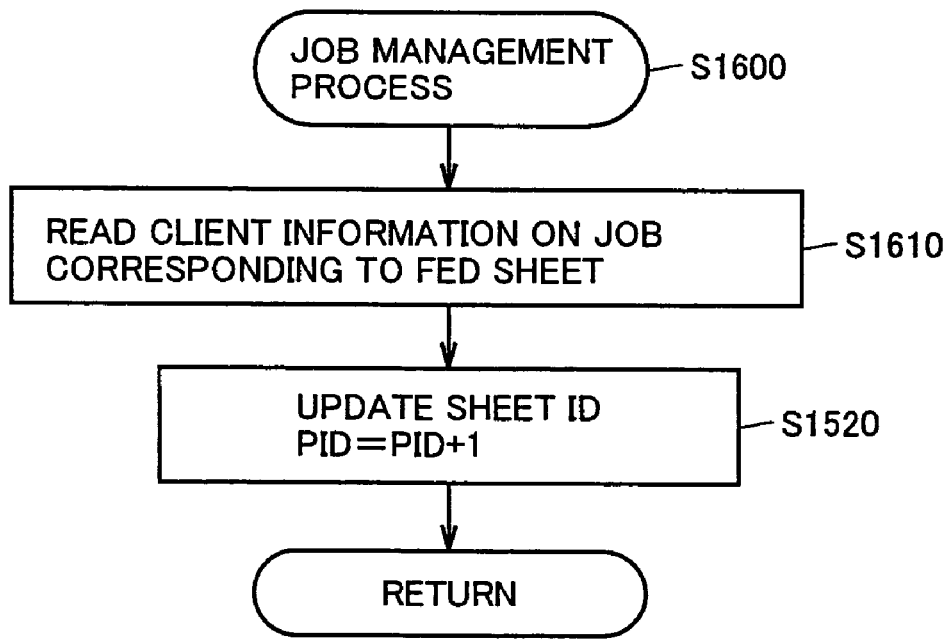

Referring to FIG. 16, procedures for the JOB management processes in another aspect will be described. As described above, the JOB management processes are executed after the toner is fixed onto sheet 600. However, a timing of executing the processes is not limited to this timing. For example, the processes may be executed when sheet 600 is fed from sheet feed cassette 215 or 216.

Namely, in step S1610, CPU 400 reads the client information on JOB for the fed sheet. In step S1620, CPU 400 updates PID.

Figure 17:
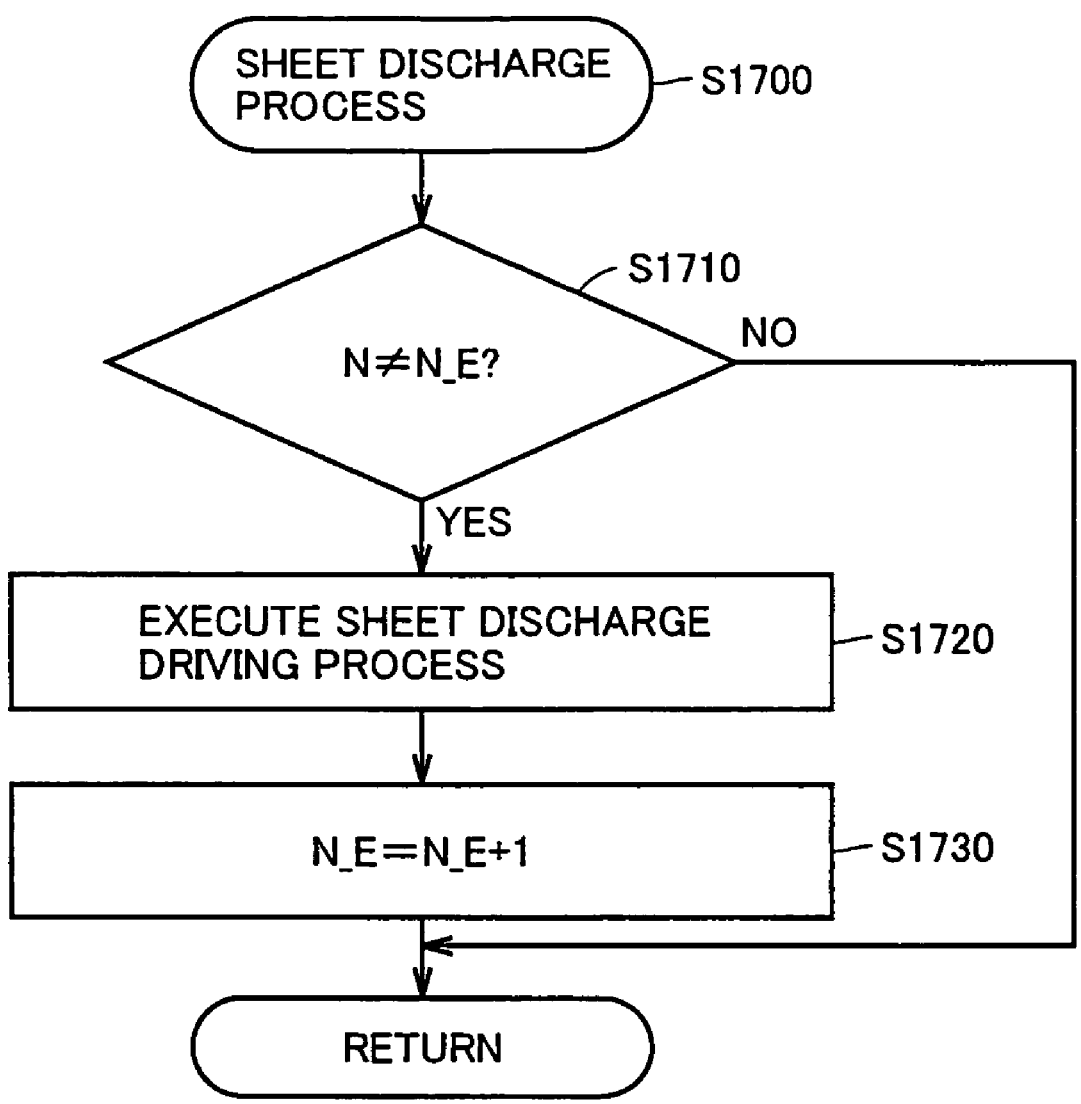

FIG. 17 is a flowchart that shows a procedure for the sheet discharge processes executed by CPU 400.

In step S1710, CPU 400 determines whether the number of prints N is different from the number of discharged sheets N_E. If CPU 400 determines that N is different from N_E ("YES" in step S1710), the processing advances to step S1720. Otherwise ("NO" in step S1710), the process is finished and returned to the basic routine processing.

In step S1720, CPU 400 executes a preset discharge driving process. When this process is executed, the sheet onto which the toner is fixed is output to sheet exit tray 204. In step S1730, CPU 400 increments a number-of-discharged-sheets counter N_E by "1". Thereafter, the processing is returned to the basic routine processing.

Figure 18:
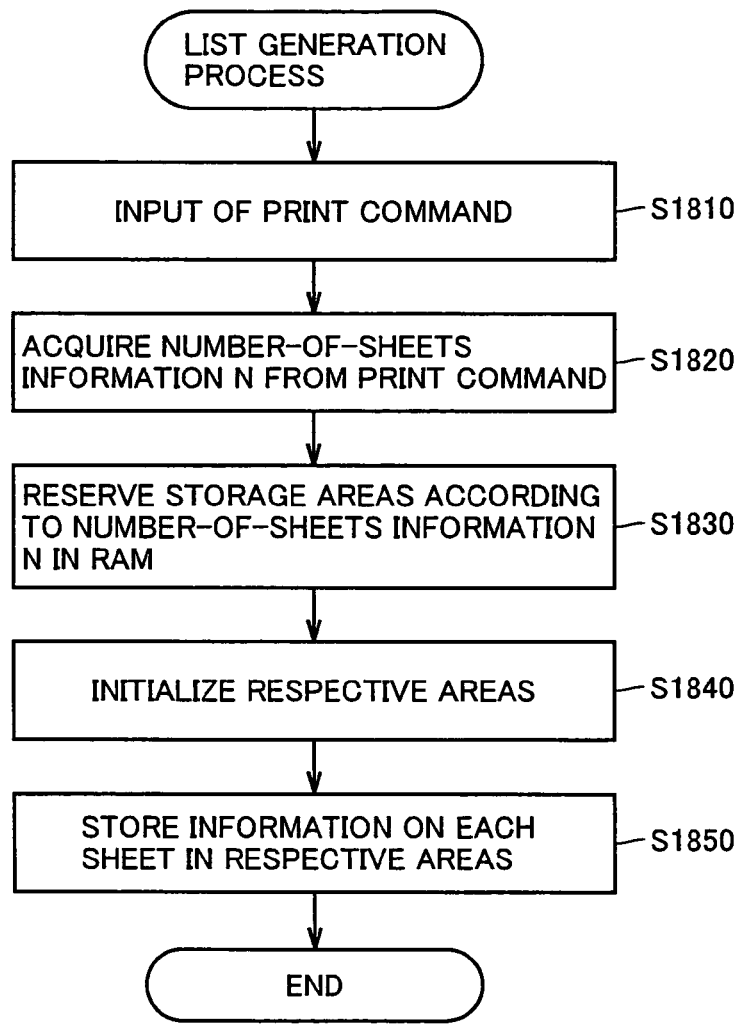

FIG. 18 is a flowchart that shows a procedure for list formation processes executed by CPU 400. These processes are executed successively when printer 200 receives a print command through network 110.

In step S1810, CPU 400 detects that the print command is input. In step S1820, CPU 400 acquires information on number of sheets N from the print command. Number-of-sheets information N can be acquired based on, for example, the number of control codes representing a form feed (or a page-eject character) included in print command target document data. In step S1830, CPU 400 reserves a storage area according to number-of-sheets information N in a predetermined area in RAM 220. An example of this storage area will be described later. In step S1840, CPU 400 initializes the secured area. By this initialization, a control character representing that no information is present (hereinafter "null") is stored in the area. In step S1850, CPU 400 stores information on each sheet based on the print command in each area. This information includes PID for identifying each sheet.

Figure 19:
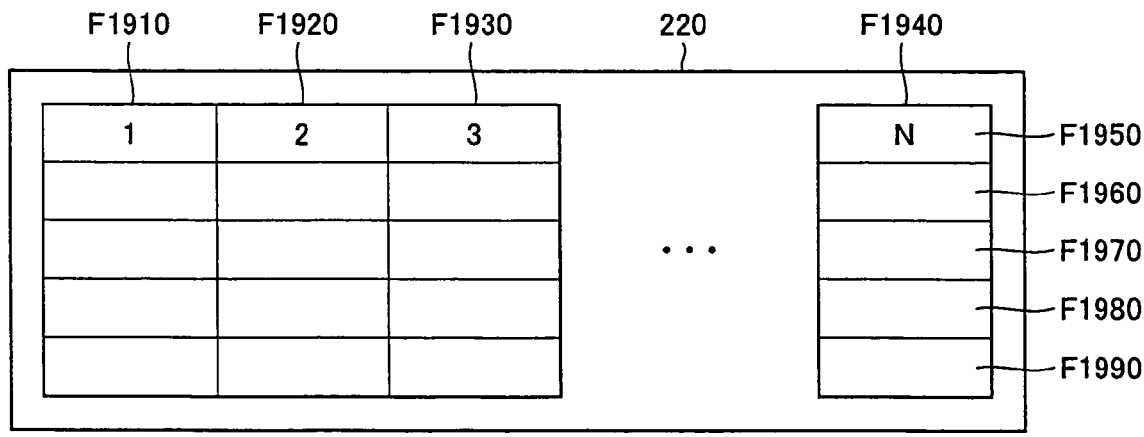

Referring to FIGS. 19 to 24, a data structure of printer 200 according to this embodiment will next be described. FIG. 19 conceptually shows one example of storing data in RAM 220.

In RAM 220, sheet information storage areas for storing the information on each sheet according to an input print command are secured in areas F1910 to F1940. Each of the sheet information storage areas F1910 to F1940 includes areas F1950 to F1990. An information number for indicating that the information is the one on each sheet is stored in area F1950. A value N allocated as a maximum information number is determined based on, for example, the number of sheets 600 that can be discharged to sheet exit tray 204 of printer 200. A name of computer 150 (hereinafter also referred to as "client") that outputs the print command is stored in area F1960. A sheet ID for identifying a start position of one print command (i.e., JOB) output from one client (hereinafter, "StartPID") is stored in area F1970. A sheet ID for identifying an end position of JOB (hereinafter, "EndPID") is stored in area F1980. PID of each sheet 600 is stored in area F1990. With this data configuration, a print command in response to which the sheets belonging to the same client are continuously discharged is defined as JOB. CPU 400 can thereby execute processes based on this definition.

FIG. 20 illustrates a change in the data stored in RAM 220. The change will be described on the following assumption. No sheet is present in sheet exit tray 204. A client A outputs a print command to print three sheets. A client B outputs a print command to print two sheets. A client C outputs a print command to print four sheets.

Referring to FIG. 20(A), if client A outputs the print command and sheet information has been written to one of three sheets 600 in response to the print command from client A, client name (=A), StartPID (=1), EndPID (=1), and PID (=1) are stored in the respective areas corresponding to information number "1" in area F1950.

Referring to FIG. 20(B), if sheet information has been written to second sheet 600 for client A, client name (=A), StartPID (=1), EndPID (=2), and PID (=2) are stored in the respective areas corresponding to information number "2" in area F1950. Since value "1" is already used as PD of first sheet 600, a value "2" is used as PID of second sheet 600 next to PID (=1) (in area F1990). PIDs are similarly allocated thereafter. Further, since data on information number "2" corresponds to JOB belonging to client A, same EndPID (=2) is stored in areas corresponding to information numbers "1" and "2", respectively (in area F1980).

Referring to FIG. 20(C), if sheet information has been written to third sheet 600 for client A, client name (=A), StartPID (=1), EndPID (=3), and PID (=3) are stored in the respective areas corresponding to information number "3" in area F1950. Since data on information number "3" corresponds to JOB belonging to client A, same EndPID (=3) is stored in areas corresponding to information numbers "1" to "3", respectively (in area F1980).

Referring to FIG. 20(D), if the sheet information has been written to each of three sheets 600 in response to the print command from client A, a process in response to a print command from client B is started. Namely, if sheet information has been written to first sheet 600 for client B, client name (=B), StartPID (=4), EndPID (=4), and PID (=4) are stored in the respective areas corresponding to information number "4" in area F1950.

Referring to FIG. 20(E), if sheet information has been written to second sheet 600 for client B, client name (=B), StartPID (=4), EndPID (=5), and PID (=5) are stored in the respective areas corresponding to information number "5" in area F1950. Since data on information number "5" corresponds to JOB belonging to client B, the same EndPID (=5) is stored in areas corresponding to information numbers "4" and "5", respectively (in area F1980).

Referring to FIG. 20(F), a print process for client C is then similarly executed. Pieces of data are stored in respective areas corresponding to information numbers "6" to "9" in area F1950. In this case, same StartPID (=6) and same EndPID (=9) are stored in corresponding four areas. Further, the respective areas corresponding to information numbers "10" to "N" in area F1950 are not used for the JOB processing. Therefore, "null" stored when the respective areas are initialized is stored in each of the areas as it is.

In this case, the data for specifying JOB, that is, StartPID and EndPID are made to associate with each sheet ID. Thanks to this, even if data input to printer 200 is interrupted halfway, JOB can be specified for the input data. This makes it possible to accurately perform processings to be described later, e.g., a sheet pulling-out processing.

The example of specifying JOB is not limited to the above-described example. Namely, StartPID and EndPID are not necessarily made to associate with each sheet ID. For example, numbers for specifying the respective commands input to printer 200 may be sequentially set and used as numbers for specifying JOBs.

FIG. 21 shows one example of storing the data read by IC tag reader 300 in RAM 220. The example will be described on the following assumption. Three sheets 600 are left in sheet exit tray 204. Three sheets 600 associate with two sheets 600 (PID=1 and PID=3) for client A and one sheet 600 (PID=6) for client C, respectively. Therefore, information from sheets 600 allocated PIDs of 1, 3, and 6 is received by IC tag reader 300. Further, the data shown in FIG. 21 is provided on the assumption of JOB including the items of data shown in FIG. 20.

IC tag reader 300 transmits a sheet information transmission request to sheet exit tray 204 in a preset cycle (e.g., at intervals of 1000 milliseconds). In response to the transmission of this request, the areas in RAM 220 are initialized and "null" is stored in each of the areas. When IC tag 700 allocated to each sheet 600 piled up on sheet exit tray 204 transmits the sheet information in response to the request, IC tag reader 300 receives the information. The received information is output from IC tag reader 300 to CPU 400. CPU 400 stores the received information in the predetermined areas in RAM 220.

As shown in FIG. 21, the client name included in the received information is stored in area F2160 in each of the areas corresponding to information numbers "1" to "3" in area F2150. The data for identifying sheet 600, i.e., PID is stored in area F2190. Since no data is stored in the other areas in RAM 220, "null" stored when the areas are initialized is written in each of the areas as it is. These items of data are received by IC tag reader 300. Due to this, when the sheet exit status of sheet exit tray 204 is changed, the data is updated according to the change. For example, when sheets 600 are partially pulled out, information on pulled-out sheets 600 is not received. As a result, fewer areas than the areas secured in advance are used.

As can be seen, CPU 400 stores the items of information on the discharged sheets in RAM 220 (see FIG. 20), and stores the items of information read by tag reader 300 in the other areas in RAM 220 while the former and the latter information are equal in configuration (see FIG. 21). By doing so, CPU 400 can promptly execute the process for detecting whether a sheet 600 is pulled out. Printer 200 can, therefore, notify the user of the sheet exit status of sheet exit tray 204 at real time.

FIG. 22 illustrates a change in the data structure shown in FIG. 19.

When IC tag reader 300 receives data based on the assumption shown in FIG. 21, the items of data (see FIG. 20) initially stored in the predetermined areas in RAM 220 are updated as shown in FIG. 22(A). For example, "null" is stored in each of the areas for client B. That is, "null" is stored in each of the sheet information storage areas for the client such as client B for whom all the sheets are pulled out, and the areas are opened. As a result, the opened areas can be used for the other data processings.

Referring to FIG. 22(B), when CPU 400 executes sort processes for the data stored in RAM 220, information on client C is stored in the areas corresponding to information numbers "4" and "5" in area F1950. Since specific procedures for the sort processes are well known, they will not be described herein.

FIG. 23 shows one example of the data stored in RAM 220. Referring to FIG. 23, an example, in which clients A, B, C, D, E, F, G, H, and I output print commands respectively, will be described. In the example of FIG. 23, client A outputs three different print commands. As shown in FIG. 23, items of information corresponding to the print commands are sequentially stored in the respective areas corresponding to information numbers "1"to "20" in area F1950 in an order in which clients A, B, C, D, E, F, G, H, and I connected to network 110 output their print commands.

Referring to area F1960 shown in FIG. 23, the print commands are output in an order of clients A, B, C, D, E, A, G, H, I, and A. In this example, client A outputs the three print commands. However, since the respective print commands are separated by the print commands from the other clients, the commands are handled as different JOBs. Namely, printer 200 regards the respective commands as independent print commands and allocates StartPID and EndPID to each sheet in response to each command. As for information numbers "1" and "2" in area F1950, for example, StartPID (=1) and EndPID (=2) are allocated to each sheet in areas F1970 and F1980, respectively. As for information numbers "11" and "12", start PID (=11) and End PD (=12) are allocated to each sheet in areas F1970 and F1980, respectively. As for information numbers "19" and "20", start PID (=19) and End PID (=20) are allocated to each sheet in areas F1970 and F1980, respectively.

FIG. 24 shows one example of the data stored in RAM 220 at a different timing. This timing is, for example, the one when it is detected that sheet 600 is pulled out from sheet exit tray 204.

When client A pulls out sheets 600 output from sheet exit tray 204 of printer 200 based on the last print command, i.e., two sheets 600 corresponding to information numbers "19" and "20", IC tag reader 300 cannot acquire information on sheets 600 corresponding to information numbers "19" and "20". In this case, as shown in FIG. 24, no predetermined data is stored in the areas corresponding to information numbers "19" and "20". If so, CPU 400 can detect that sheets 600 are pulled out by comparing the data shown in FIG. 23 with the data shown in FIG. 24. Namely, if a comparison result indicates that some information is missing from the information acquired by IC tag reader 300, a difference between the two items of information is detected. CPU 400, therefore, detects that sheets 600 corresponding to the missing information are pulled out. The processes will be described later in detail.

Figure 25:
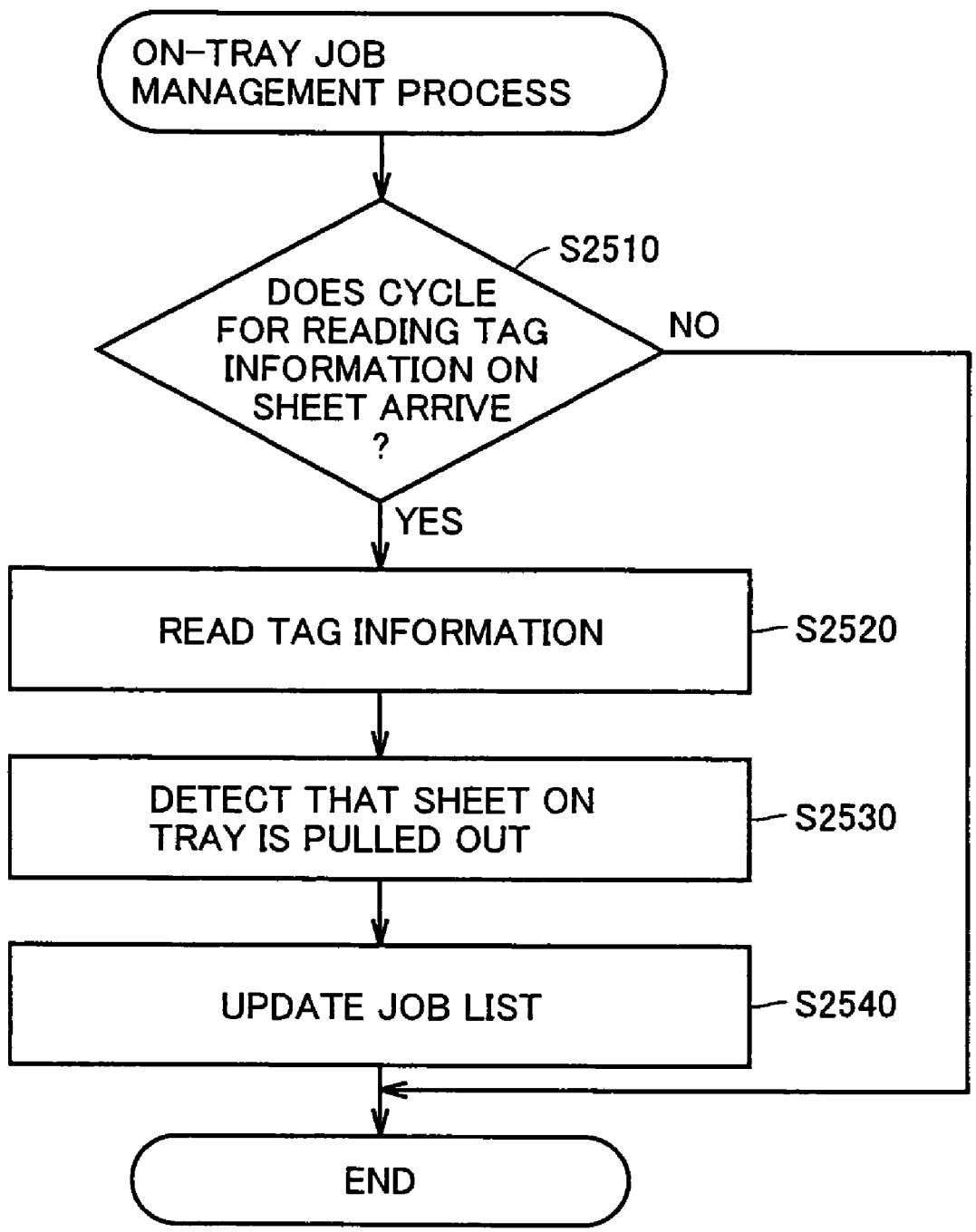
FIGS. 25 to 27 are flowcharts that show a procedure for processes executed by the printer according to the first embodiment of the present invention.
Figure 26:
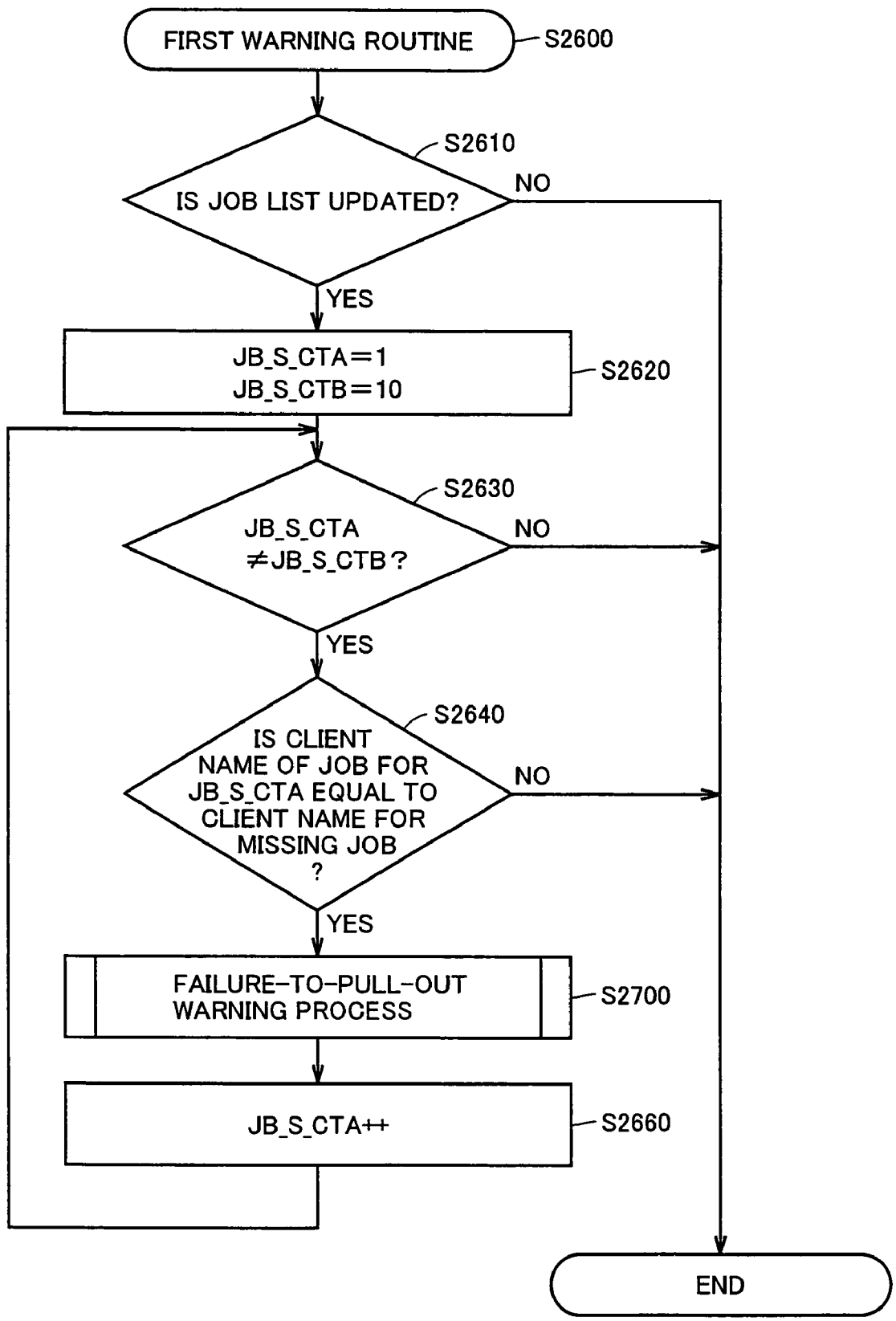
Figure 27:
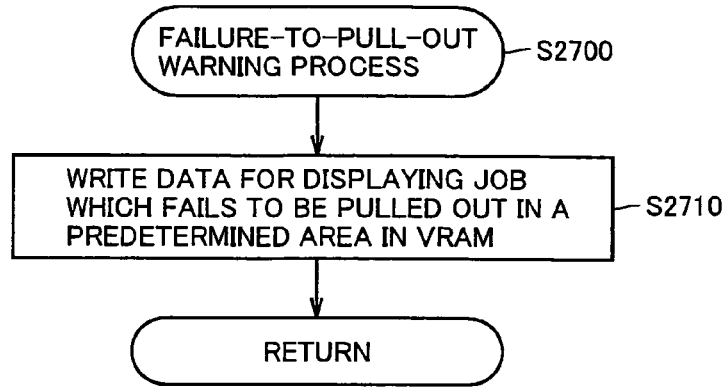

Referring to FIGS. 25 to 27, the control structure of printer 200 according to this embodiment will further be described. FIG. 25 is a flowchart that shows a procedure for the JOB management processes executed by CPU 400.

In step S2510, CPU 400 determines whether a cycle for reading the tag information on each sheet 600 on sheet exit tray 204 arrives based on a time signal from clock 208. If CPU 400 determines that the cycle arrives ("YES" in step S2510), the processing advances to step S2520. Otherwise ("NO" in step S2510), the processes are finished and CPU 400 waits until a next timing comes.

In step S2520, CPU 400 outputs a predetermined communication command to IC tag reader 300, thereby acquiring the tag information from IC tag 700 allocated to each sheet 600 piled up on sheet exit tray 204. The acquired information is stored in the predetermined areas in RAM 220 (see FIG. 24). In step S2530, CPU 400 detects whether sheet 600 is pulled out from sheet exit tray 204 based on the information stored when the print command is input (see FIG. 23) and on the information acquired by IC tag reader 300 (see FIG. 24). This detection is made by determining whether there is a missing item from the data items stored when each print command is input. In step S2540, CPU 400 updates a JOB list stored in the predetermined area in RAM 220. This list is the items of data stored in the manner shown in, for example, FIGS. 20A to 20F.

FIG. 26 is a flowchart that shows a procedure for a first warning routine executed by CPU 400. CPU 400 executes this routine by executing a program stored in flash memory 209. This routine is executed independently of other processes, e.g., the JOB management processes shown in FIG. 25.

In step S2610, CPU 400 determines whether the JOB list is updated. This determination is made by, for example, reading a JOB list data update time, and by determining whether the JOB list data update time coincides with the time when the print command is input. Alternatively, a flag representing an update may be turned on when the JOB list is updated in step S2540 shown in FIG. 25, and the determination may be made based on the flag. If CPU 400 determines that the JOB list is updated ("YES" in step S2610), the processing advances to step S2620. Otherwise ("NO" in step S2610), the processes are finished.

In step S2620, CPU 400 initializes a counter for checking sheets 600 left on sheet exit tray 204. In this embodiment, CPU 400 sets a job counter JB_S_CTA for checking JOB left on sheet exit tray 204 at "1". In addition, an upper limit counter JB_S_CTB for setting an upper limit value of the counter at "10"A value of upper limit counter JB_S_CTB is obtained by, for example, measuring the number of continuous areas corresponding to the print command of the same client name based on the data stored in area F1960 in RAM 220 as shown in FIG. 23. According to this measurement method, if the same client outputs a plurality of print commands and the print commands from the other clients are present between these print commands, the respective print commands from the same client are calculated as different JOBs. Alternatively, in another aspect, if a single command is output for two items of data and the other commands are present between the two items of data, the respective items of data may be recognized as independent JOBs.

In step S2630, CPU 400 determines whether JB_S_CTA is different from JB_S_CTB. If CPU 400 determines that JB_S_CTA is different from JB_S_CTB ("YES" in step S2630), the processing moves to step S2640. Otherwise ("NO" in step S2630), the processes are finished.

In step S2640, CPU 400 determines whether the client name of JOB for JB_S_CTA is equal to the client name for missing JOB, i.e., the name of the client that pulls out sheet 600. If CPU 400 determines that they are equal ("YES" in step S2640), the processing moves to step S2700. Otherwise ("NO" in step S2640), the processes are finished.

In step S2700, CPU 400 executes a failure-to-pull-out warning process. When this process is executed, printer 200 executes a preset warning process and notifies the user that JOB is pulled out. In step S2660, CPU 400 increments job counter JB_S_CTA by "1" and returns the processing to step S2630.

FIG. 27 is a flowchart that shows a procedure for the failure-to-pull-out warning process executed by CPU 400. This processing is executed when a message is displayed on display panel 230 to warn that sheet 600 fails to be pulled out.

In step S2710, CPU 400 writes data for displaying JOB which fails to be pulled out in a predetermined area in VRAM 212. When this data has been written in the predetermined area, display panel 230 displays a predetermined message based on the data.

Figure 28:
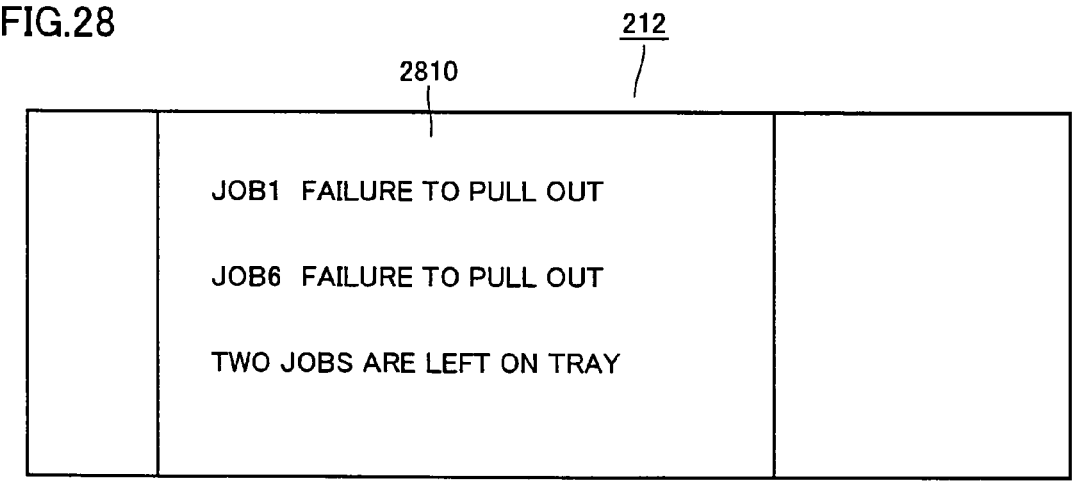
FIG. 28 shows a data structure for the printer according to the first embodiment of the present invention.
Figure 29:
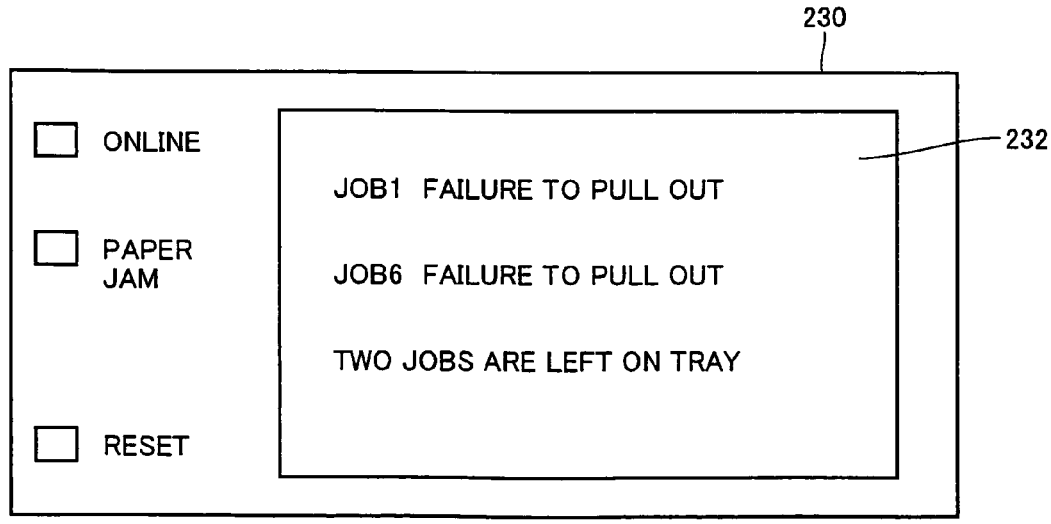
FIG. 29 shows a display screen of a display panel included in the printer according to the first embodiment of the present invention.

Referring to FIGS. 28 and 29, one example of a warning issued by printer 200 according to this embodiment will be described. FIG. 28 conceptually shows a data structure in VRAM 212. FIG. 29 shows a warning message display screen of display panel 230 included in printer 200.

As shown in FIG. 28, data for displaying the warning message is stored in an area 2810 in VRAM 212. The warning message includes a preset form message and notification data for notifying the user that JOB fails to be pulled out. The form message is, for example, a message routinely displayed irrespectively of a content of the warning. In the example shown in FIG. 28, the form message is "FAIL TO PULL OUT JOB" and "JOB IS LEFT ON TRAY". The notification data is data acquired specifically according to a content of the warning. In the example shown in FIG. 28, the notification data is associated with two JOBs, i.e., "JOB1" and "JOB6".

Referring to FIG. 29, when such data is written to VRAM 212, display panel 230 displays the message according to the data. Each user of printer 200 can, therefore, promptly know which JOB fails to be pulled out while referring to the message displayed on display panel 230.

In the following description, the processes for displaying a predetermined message on display area 232 in display panel 230 is realized similarly by the manners shown in FIGS. 28 and 29. Therefore, the description will not be repeated.

As described so far, printer 200 according to this embodiment detects whether sheet 600 discharged to sheet exit tray 204 is pulled out based on the data stored in RAM 220 and on the data read by IC tag reader 300. When detecting that sheet 600 is pulled out, printer 200 displays the message for notifying the user that sheet 600 is pulled out on display panel 230. The user near printer 200 can know that discharge sheet 600 is pulled out without checking the print surface of sheet 600. Even if printer 200 is shared among a plurality of clients, the user corresponding to each client can thereby easily recognize that sheet 600 fails to be pulled out or sheet 600 is erroneously pulled out.

Furthermore, printer 200 according to this embodiment compares the information read by IC tag reader 300 (see FIG. 24) with the information equal in item to the information read by IC tag reader 300 but stored in the other areas (see FIG. 23), thereby detecting that sheet 600 is pulled out from sheet exit tray 204. If so, it is possible to accurately detect that sheet 600 is pulled out and to thereby suppress occurrence of wrong warning.

Moreover, printer 200 according to this embodiment can detect that sheets 600 are pulled out at preset time intervals, and can, therefore, notify the user of the sheet exit status of sheet exit tray 204 at real time.

First Modification of First Embodiment

Figure 31:
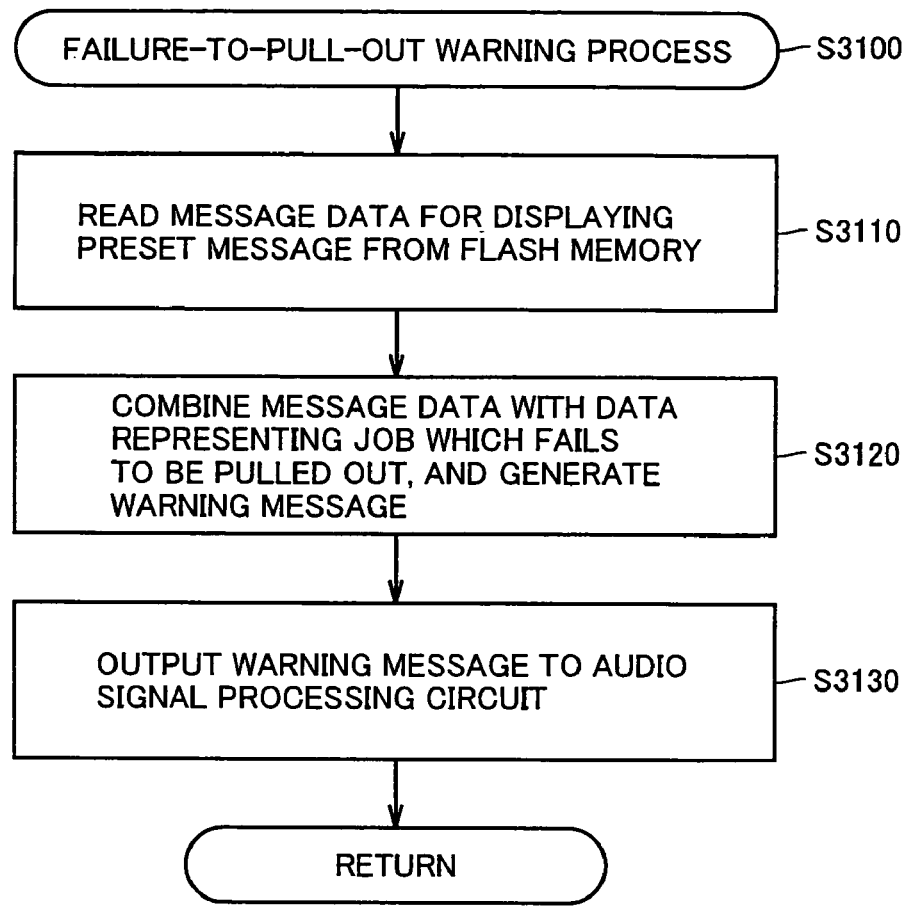
FIG. 31 is a flowchart that shows a procedure for processes executed by the printer according to the first modification of the first embodiment of the present invention.
Figure 32:
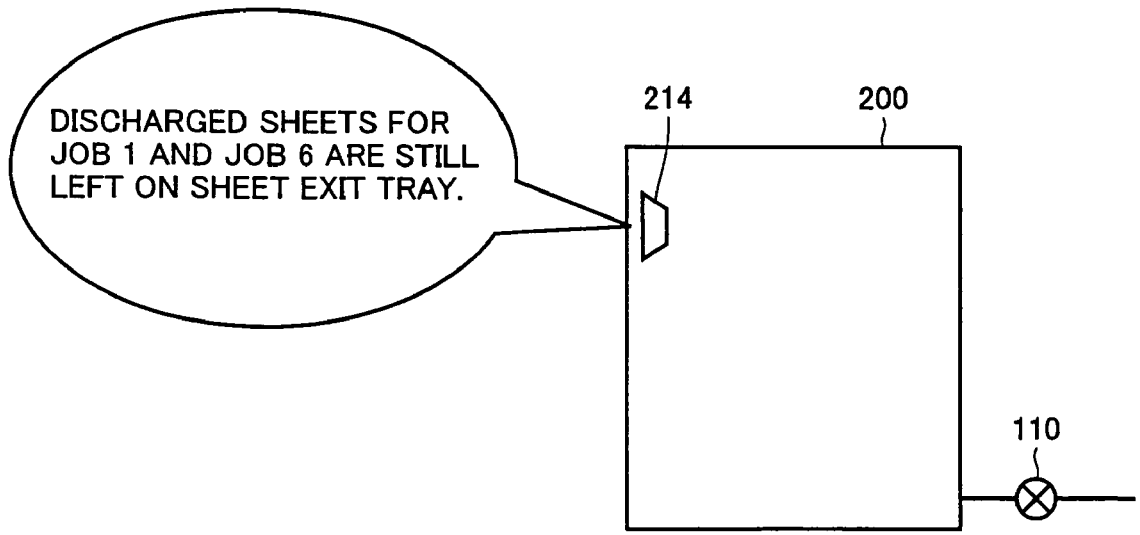
FIG. 32 illustrates an example of a warning issued by a printer according to a second embodiment of the present invention.

Referring to FIGS. 30 to 32, a first modification of the first embodiment will be described. A printer according to this modification differs from printer 200 according to the first embodiment by including a function of notifying the user that JOB fails to be pulled out or JOB is erroneously pulled out by a sound. Namely, the printer according to this modification stores audio data for outputting a preset form message by a sound in a predetermined area in flash memory 209. This printer generates an audio signal by combining information for specifying a failure to pull out JOB detected based on the information acquired by IC tag reader 300 with the audio data. Loudspeaker 214 (see FIG. 2) outputs the sound based on this audio signal. The printer according to this modification is equal in hardware configuration to printer 200 shown in FIG. 2. The printer is also equal in function to printer 200. The hardware configuration and functions of the printer according to this modification will not be, therefore, repeatedly described herein.

Referring to FIG. 30, a data structure of printer 200 according to this modification will be described. FIG. 30 conceptually shows one example of storing the audio data in flash memory 209.

In flash memory 209, the audio data for notifying the user that one of JOBs fails to be pulled out is stored in an area F3010. Namely, audio data "message00.audio" generated as a form message in a predetermined data form is converted into a sound "DISCHARGED SHEET FOR JOB X IS STILL LEFT ON EXIT TRAY" by a predetermined conversion process performed by an audio signal processing circuit 213. Audio data for notifying the user that two JOBs fail to be pulled out is stored in an area F3020.

Likewise, audio data for notifying the user that a specific JOB is erroneously pulled out is stored in each of areas F3030 and F3040. Audio data for notifying the user that partial JOBs are erroneously pulled out is stored in each of areas F3050 and F3060. As for these items of audio data, similarly to the above, by combining specific items of data for specifying JOB to be notified, a warning for the JOB can be output to loudspeaker 214. It is noted that a mode of storing the audio data is not limited to that shown in FIG. 30. Manners of the respective notifications will be described later in detail.

Referring to FIG. 31, the control structure of printer 200 according to this modification will be described. FIG. 31 is a flowchart that shows a procedure for failure-to-pull-out warning processes executed by CPU 400. These processes are executed in place of the failure-to-pull-out warning process (at S2700) in the first warning routine shown in FIG. 26.

In step S3110, CPU 400 reads message data for displaying a preset message from a predetermined area in flash memory 209. In step S3120, CPU 400 combines the read message data with data representing JOB which fails to be pulled out, thereby generating the warning message to be notified. In step S3130, CPU 400 outputs the warning message to audio signal processing circuit 213. Audio signal processing circuit 213 converts the warning message into an audio signal by executing the predetermined conversion process, and outputs the audio signal. Loudspeaker 214 produces a warning message based on the audio signal.

FIG. 32 illustrates an example of the warning processing performed by printer 200 according to this modification. When printer 200 connected to network 110 detects that discharged sheets 600 for JOB1 and JOB6 fail to be pulled out, loudspeaker 214 outputs a combined sound that notifies this state.

As can be seen, printer 200 according to this modification detects whether sheet 600 discharged to sheet exit tray 204 is pulled out. If detecting that sheet 600 is pulled out, printer 200 issues a warning to this effect to the user by a sound. It is thereby possible that even the user distant from printer 200 easily recognizes that predetermined JOB fails to be pulled out.

Second Modification of First Embodiment

Figure 33:
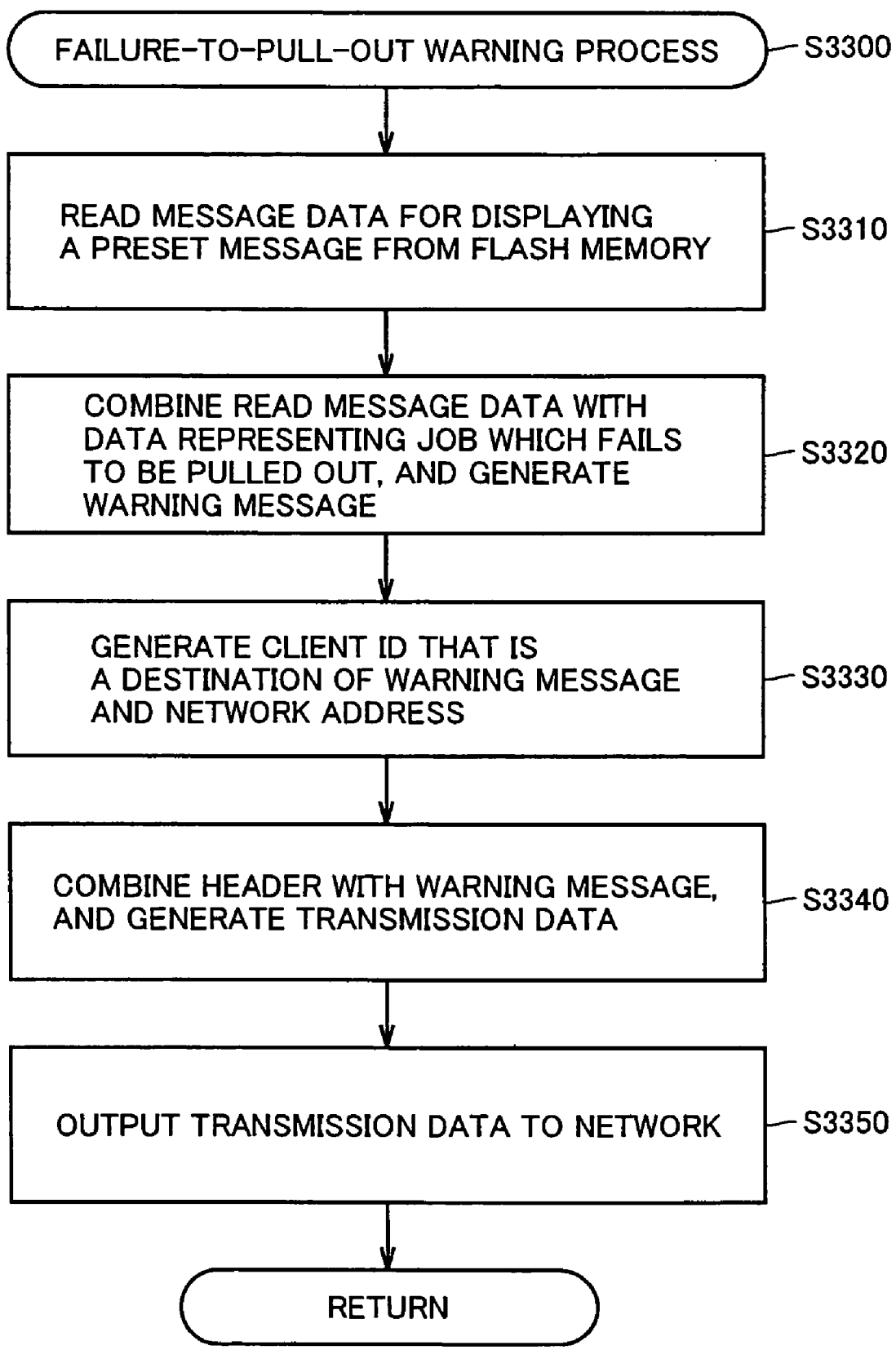
FIG. 33 is a flowchart that shows a procedure for processes executed by the printer according to the second modification of the first embodiment of the present invention.
Figure 34:
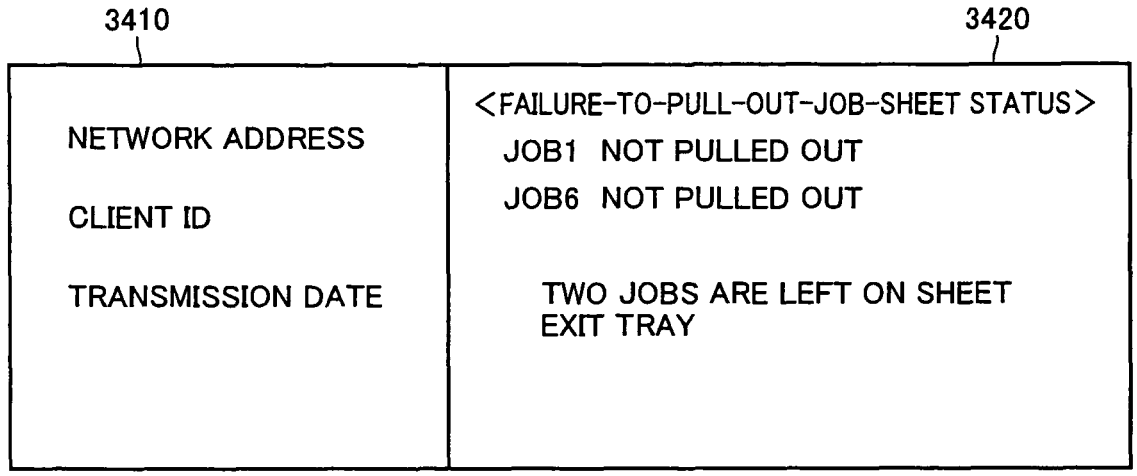
FIG. 34 shows a structure of data transmitted by the printer according to the second modification of the first embodiment of the present invention.
Figure 35:
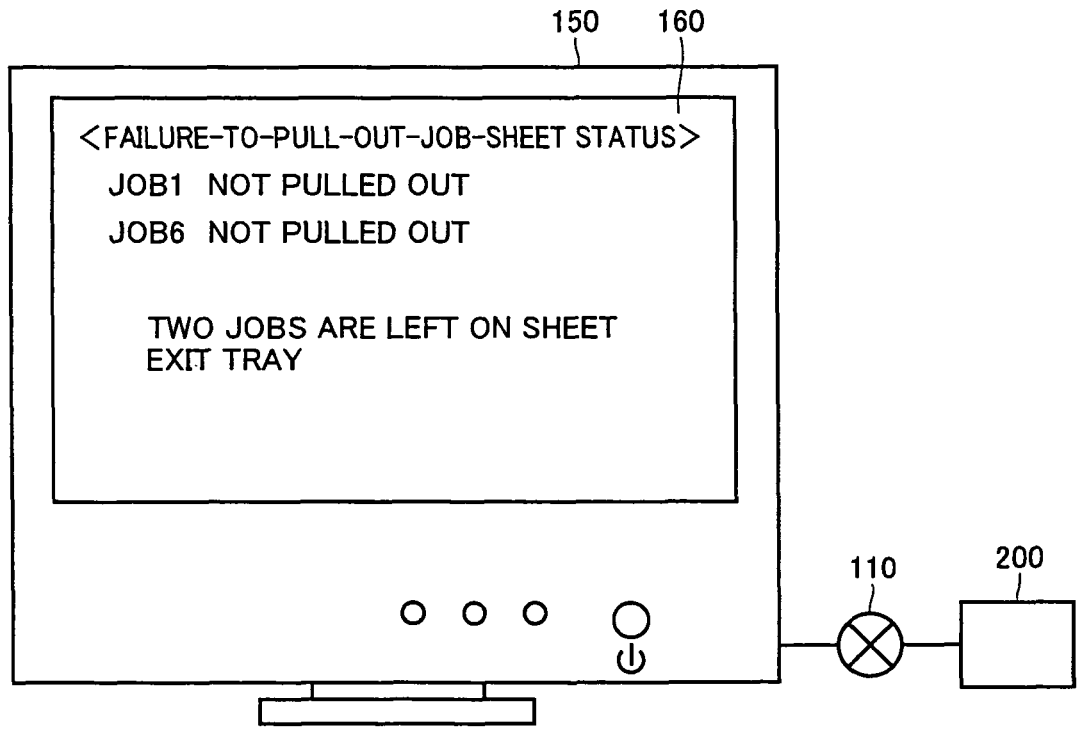
FIG. 35 shows a screen displayed by a computer connected to the printer according to the second modification of the first embodiment of the present invention.

Referring to FIGS. 33 to 35, a second modification of the first embodiment will be described. Printer 200 according to the second modification differs from printer 200 according to the first embodiment by including a function of displaying a message for notifying each computer 150 connected to network 110 that a sheet fails to be pulled out. The printer according to this modification is equal in hardware configuration to printer 200 shown in FIG. 2. The printer is also equal in function to printer 200. The hardware configuration and functions of the printer according to this modification will not be, therefore, repeatedly described herein. Printer according to this modification is realized by changing the control structure of CPU 400 as will be described below.

Referring to FIG. 33, the control structure of printer 200 according to this modification will be described. FIG. 33 is a flowchart that shows a procedure for failure-to-pull-out warning processes executed by CPU 400.

In step S3310, CPU 400 reads message data for displaying a preset message from a predetermined area in flash memory 209. This data is data for a form message used irrespective of a content of the warning. In step S3320, CPU 400 combines the read message data with data representing JOB which fails to be pulled out, thereby generating the warning message to be notified. In step S3330, CPU 400 generates a client ID and a network address for identifying a client that is a destination of the warning message. The client or the destination of the warning message is the client that transmits JOB which fails to be pulled out. The header is generated by, for example, the data stored in area F520 and the data stored in area F540 as shown in FIG. 5. The data structure will be described later in detail.

In step S3340, CPU 400 combines the generated header with the warning message, thereby generating transmitted data. In step S3350, CPU 400 outputs the transmitted data to network 110 through communication section 211. The output data is transmitted to computer 150 used by a predetermined user.

Referring to FIG. 34, a structure of the transmitted data generated by printer 200 according to this modification will be described.

The transmitted data includes a header 3410 and a warning message 3420. Header 3410 includes a network address, a client ID, and a transmission date. Alternatively, header 3410 may include other preset data items. Warning message 3420 includes data for displaying a content notified by the message, i.e., <status of failure to pull out JOB sheet>. Warning message 3420 also includes data representing JOB which is detected to fail to be pulled out. This data differs according to a result of acquiring information from each sheet 600 by IC tag reader 300.

Referring to FIG. 35, an example of the warning issued by computer 150 connected to printer 200 according to this modification will be described. FIG. 35 illustrates a screen displayed on a display 160 included in computer 150.

When printer 200 outputs the transmitted data, the data is input to computer 150 connected to network 110. Display 160 of computer 150 displays a content included in the data. Namely, as shown in FIG. 35, display 160 displays the screen for notifying a failure to pull out JOB based on the data included in warning message 3420.

As can be seen, printer 200 according to this modification notifies each computer 150 connected to network 110 that the sheet is pulled out from sheet exit tray 204. The user of each computer 150 can thereby easily know that the sheet discharged in response to the user's print command fails to be pulled out without going closer to printer 200. It is noted that an external apparatus with which printer 200 according to this modification can communicate is not limited to computer 150. The external apparatus may be, for example, a cellular telephone or the other apparatus having the communication function.

Second Embodiment

Referring to FIGS. 36 to 42, a second embodiment of the present invention will be described. Printer 200 according to the second embodiment differs from printers 200 according to the first embodiment, the first modification of the first embodiment, and the second modification of the first embodiment by including a function of warning that erroneous JOB among a plurality of JOBs is pulled out from sheet exit tray 204. Printer 200 according to the second embodiment is equal in hardware configuration to printer 200 shown in FIG. 2. The printer is also equal in function to printer 200. The hardware configuration and functions of the printer according to this embodiment will not be, therefore, repeatedly described herein.

Referring to FIGS. 36 to 38, a data structure of printer 200 according to this embodiment will be described. FIG. 36 shows one example of storing data in RAM 220. It is assumed herein that clients A, C, and I output print commands, respectively. In this embodiment, client A outputs two print commands.

As shown in FIG. 36, the print commands output from the respective clients are stored in predetermined areas in RAM 220 in an order of reception by printer 200. That is, items of information corresponding to the print command to print four sheets 600 from client A are stored in areas corresponding to information numbers "1" to "4" in area F1950, respectively. Items of information corresponding to the print command from client C are stored in areas corresponding to information numbers "5" and "6" in area F1950, respectively. Items of information corresponding to the print command from client I are stored in areas corresponding to information numbers "19" and "20" in area F1950, respectively.

When a print process is executed in response to each print command, each sheet 600 is output to sheet exit tray 204. In this case, IC tag reader 300 transmits a predetermined radio signal per preset cycle, communicates with IC tag 700 included in communicable area 910 of sheet exit tray 204, and outputs information on each sheet 600. When it is detected that sheet 600 is pulled out from sheet exit tray 204 based on the information from each sheet 600, a result of pulling out each sheet 600 is reflected in a predetermined area in RAM 220.

FIG. 37 shows one example of storing data received from sheet 600 in RAM 220. FIG. 38 illustrates a manner in which client names, the number of pulled out JOBs, and the number of pulled out sheets are stored in RAM 220.

A determining scheme for puling out JOB will now be described. When JOBs are pulled out, many JOBs each consisting of, for example, a small number of sheets are sometimes output. If so, it is often appropriate to determine whether the client that pulls out more JOBs erroneously pulls out JOBs. To do so, the number of pulled-out JOBs may be calculated, the client that pulls out more JOBs may be specified, and a message for notifying the user of the client that the client erroneously pulls out JOBs may be generated for the specified client.

Further, even if many JOBs each consisting of a small number of sheets are output, a JOB consisting of a large number of sheets is very rarely output. If so, it is often appropriate to determine whether the client that pulls out more sheets erroneously pulls out the sheets. To do so, the number of pulled out sheets may be calculated, the client that pulls out most sheets from sheet exit tray 204 may be specified, and a message for notifying the user of the client that the client may possibly erroneously pull out the sheets may be generated for the specified client.

As shown in FIG. 37, when JOB for client A corresponding to information numbers "1" to "4", JOB for client I corresponding to information numbers "7" to "18", and JOB for client A corresponding to information numbers "19" and "20" are pulled out, "null" is stored in each of the corresponding areas. By doing so, it is possible to detect that these sheets are pulled out from information received from IC tag reader 300.

Namely, CPU 400 can detect information corresponding to which information number is missing by comparing the data shown in FIG. 36 with the data shown in FIG. 37. CPU 400 detects pulled-out JOBs and the clients of the JOBs based on this detection result and on the data generated based on the print command s shown in FIG. 36. CPU 400 further adds up the number of pulled out sheets for the respective clients, thereby calculating a total number of pulled-out sheets. As a result, as shown in FIG. 38, the data for notifying each user of each client of the number of pulled-out JOBs and the total number of pulled-out sheets for the client is generated.

Figure 39:
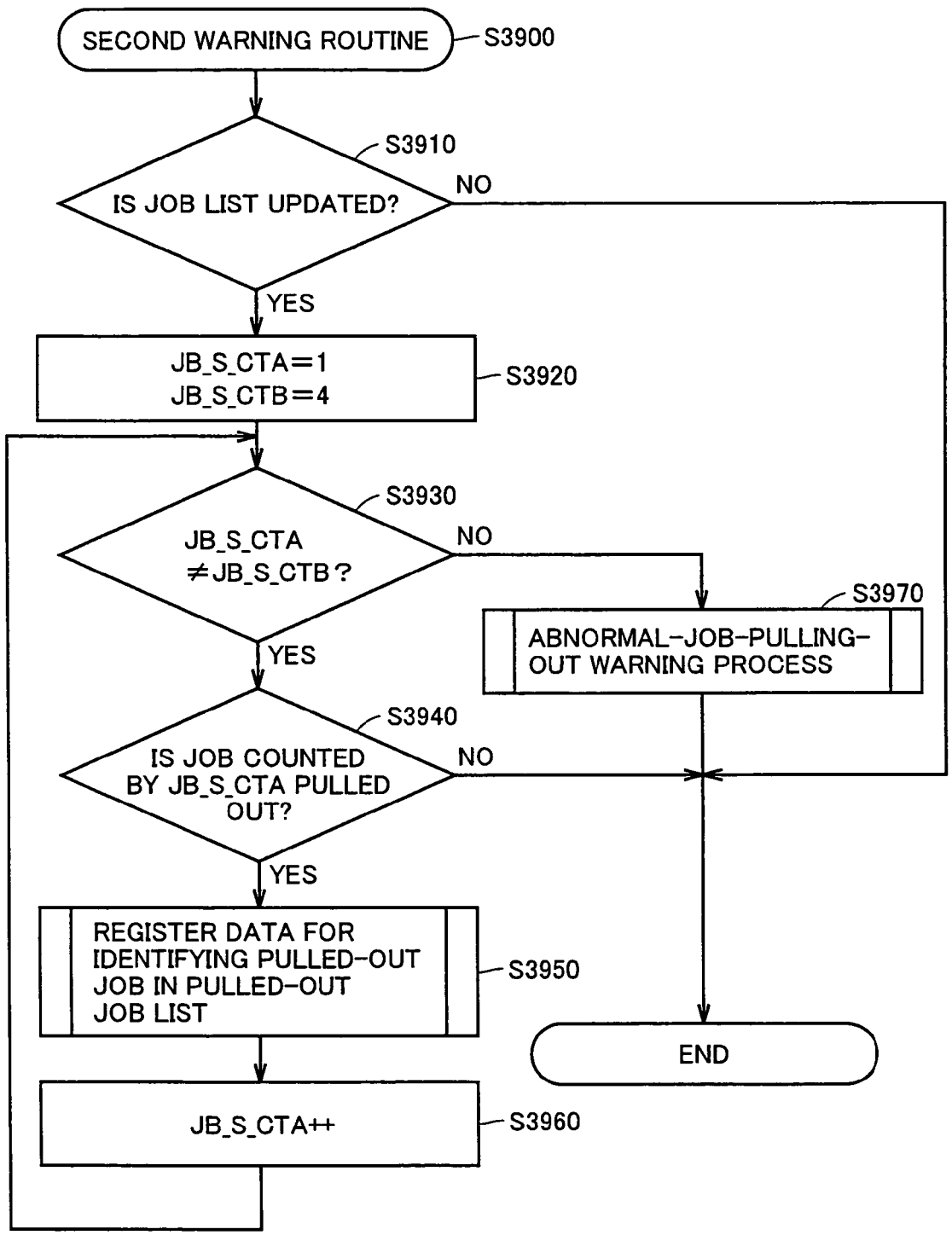
FIG. 39 is a flowchart that shows a procedure for processes executed by the printer according to the second embodiment of the present invention.

Referring to FIG. 39, a control structure of printer 200 according to this embodiment will be described. FIG. 39 is a flowchart that shows procedures for a second warning routine executed by CPU 400. This second warning routine is a processing executed in place of the processing shown in FIG. 26.

In step S3910, CPU 400 determines whether the JOB list is updated. If CPU 400 determines that the JOB list is updated ("YES" in step S3910), the processing advances to step S3920. Otherwise ("NO" in step S3910), the processes are finished and returned to the basic routine processing. In step S3920, CPU 400 initializes a counter used to execute the warning routine. Namely, CPU 400 sets job counter JB_S_CTA for checking JOB left on sheet exit tray 204 at "1". In addition, CPU 400 sets upper limit counter JB_S_CTB for setting an upper limit value of the counter at "4". The value "4" of upper limit counter JB_S_CTB is obtained by, for example, counting the number of JOBs when the print command is input based on the data shown in FIG. 36.

In step S3930, CPU 400 determines whether JB_S_CTA is different from JB_S_CTB. If CPU 400 determines that JB_S_CTA is different from JB_S_CTB ("YES" in step S3930), the processing advances to step S3940. Otherwise ("NO" in step S3930), the processing advances to step S3970. In step S3940, CPU 400 determines whether JOB counted by JB_S_CTA is pulled out. If CPU 400 determines that the JOB is pulled out ("YES" in step S3940), the processing advances to step S3950. Otherwise ("NO" in step S3940), the processes are finished and returned to the basic routine processing.

In step S3950, CPU 400 registers data for identifying JOB pulled out from sheet exit tray 204 in a pulled-out JOB list. In step S3960, CPU 400 increments JB_S_CTA by "1". In step S3970, CPU 400 executes a preset abnormal-JOB-pulling-out warning process. When this process is executed, CPU 400 warns the user that specific JOB is pulled out.

Figure 40:
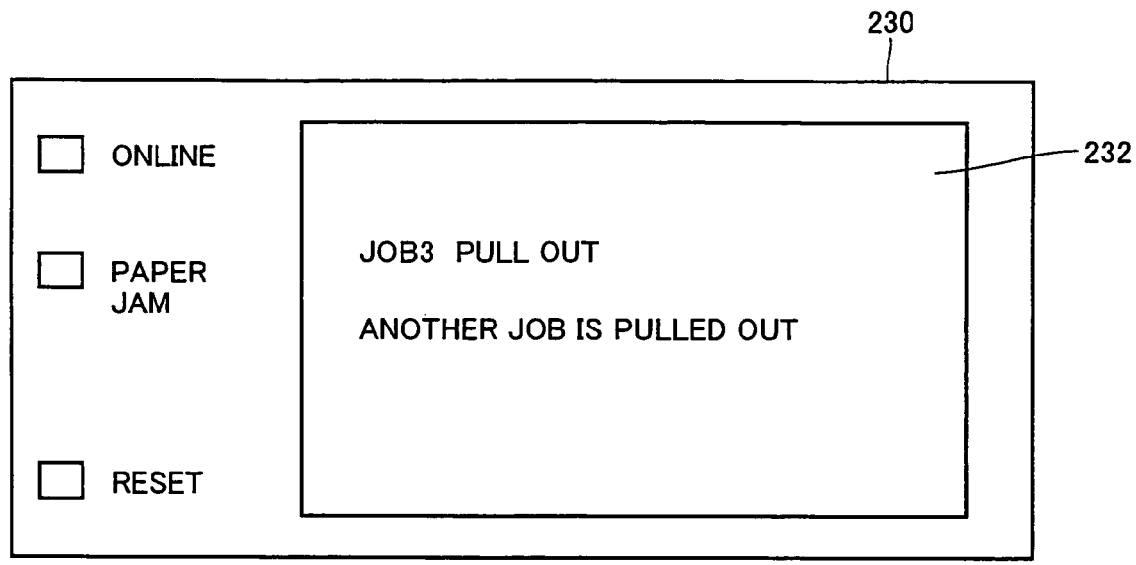
FIGS. 40 to 42 illustrate an example of a warning issued by the printer according to the second embodiment of the present invention.
Figure 41:
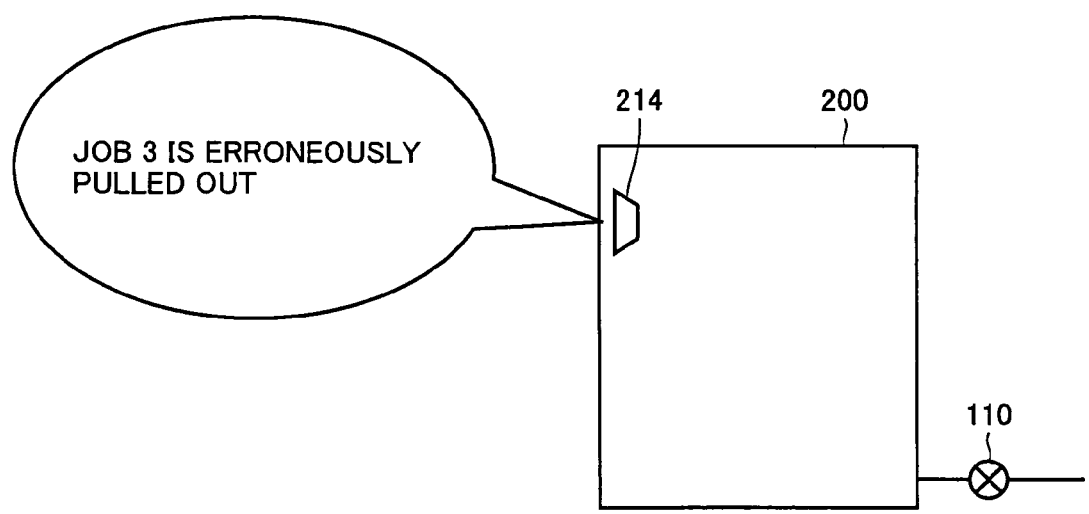
Figure 42:
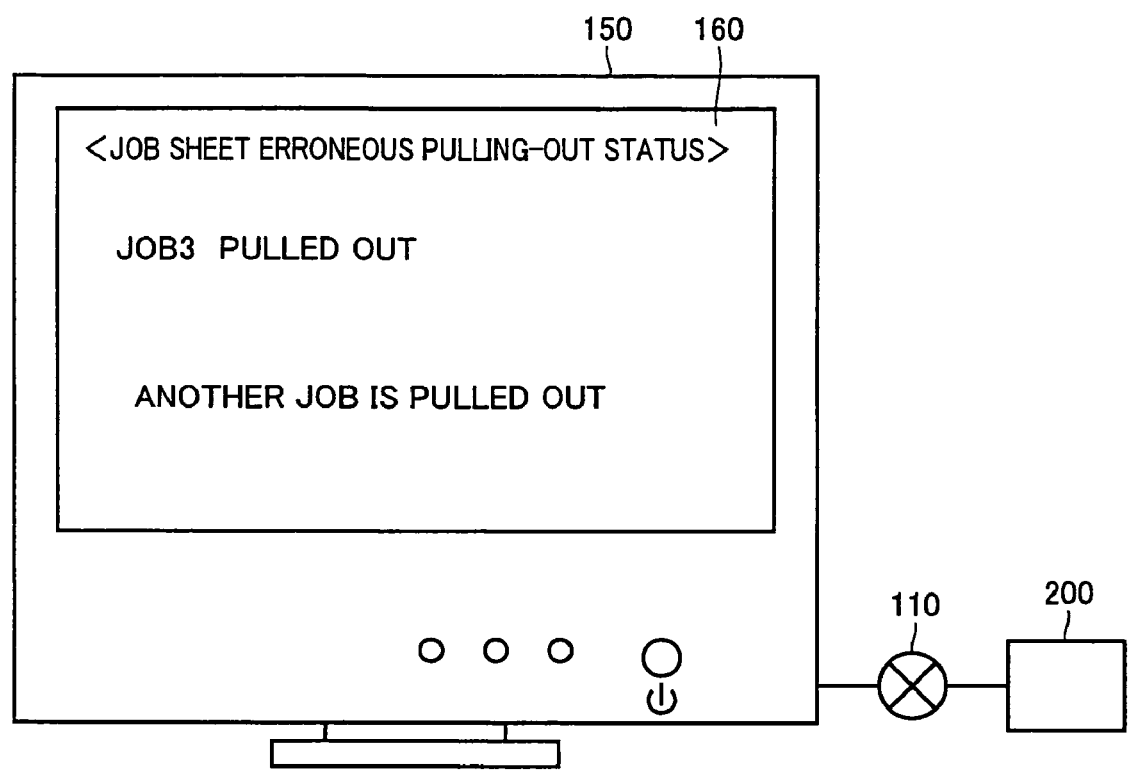

Referring to FIGS. 40 to 42, an example of the warning issued by printer 200 according to this embodiment will be described. FIG. 40 shows one example of a message screen displayed by display panel 230.

As described above, when CPU 400 writes data for warning the user that JOB is pulled out in a predetermined area in VRAM 212, display panel 230 displays a predetermined warning message (see FIG. 40) based on the written data. The user near printer 200 can thereby know that JOB is pulled out based on the message.

FIG. 41 illustrates an example in which printer 200 according to this embodiment issues a warning by producing a sound. Namely, printer 200 generates a signal for outputting the predetermined warning message by a sound based on the audio data stored in area F3030 (see FIG. 30) in flash memory 209 and on the detected data. Loudspeaker 214 produces a combined sound based on the signal. It is thereby possible that even the user distant from printer 200 easily recognizes that JOB is erroneously pulled out.

FIG. 42 shows a screen for warning the user that JOB is pulled out, displayed on display 160 included in computer 150 connected to network 110.

Computer 150 displays a predetermined message on display 160 based on the transmitted data shown in FIG. 34. This function is realized by, for example, causing the CPU (not shown) of computer 150 to execute the processing shown in FIG. 33.

As can be seen, printer 200 according to this embodiment determines the user of which client erroneously pulls out JOB for the other client based on a predetermined standard when JOBs for different clients are simultaneously pulled out from sheet exit tray 204, and displays the message for notifying the user that the sheet for the user is pulled out by the other user. By displaying the message, the user of each computer 150 can know that JOB for the user is pulled out by the other user even if the user is distant from printer 200.

Third Embodiment

Referring to FIGS. 43 to 48, a third embodiment of the present invention will be described. Printer 200 according to the third embodiment differs from printers 200 according to the first embodiment, the first and second modifications of the first embodiment and the second embodiment by including a function of detecting and notifying a user that part of JOBs are pulled out from sheet exit tray 204. Printer 200 according to the third embodiment is equal in hardware configuration and functions to printers 200 according to the respective preceding embodiments. The hardware configuration and functions of the printer according to this embodiment will not be, therefore, repeatedly described herein.

Referring to FIGS. 43 and 44, a data structure for printer 200 according to this embodiment will be described. FIG. 43 shows a structure of data stored in RAM 220 when printer 200 receives print commands. FIG. 44 shows one example of storing data acquired by IC tag reader 300. It is assumed herein that clients A, B, C, D, E, F, G, H, I, and J output prints commands, respectively.

As shown in FIG. 43, when the respective clients output print commands, printer 200 stores items of data according to the commands in RAM 220 for each sheet. After printer 200 executes a printing process based on each print command, the respective sheets are output to sheet exit tray 204. IC tag reader 300 executes predetermined communication processes in a preset cycle, and acquires information on the sheets piled up on sheet exit tray 204. These items of information thus acquired are successively stored in different areas in RAM 220.

Referring to FIG. 44, when IC tag reader 300 receives information from IC tag 700 allocated to each sheet, the received information is stored in each area based on PID included in the information. At this time, if an area in which no information is stored is present, it is determined that the sheet with an information number corresponding to the area is missing. In FIG. 44, for example, items of information with PIDs of "5", "9", and "13" are missing. CPU 400 can, therefore, notify a user of each client that part of JOBs are missing based on this missing information.

Figure 45:
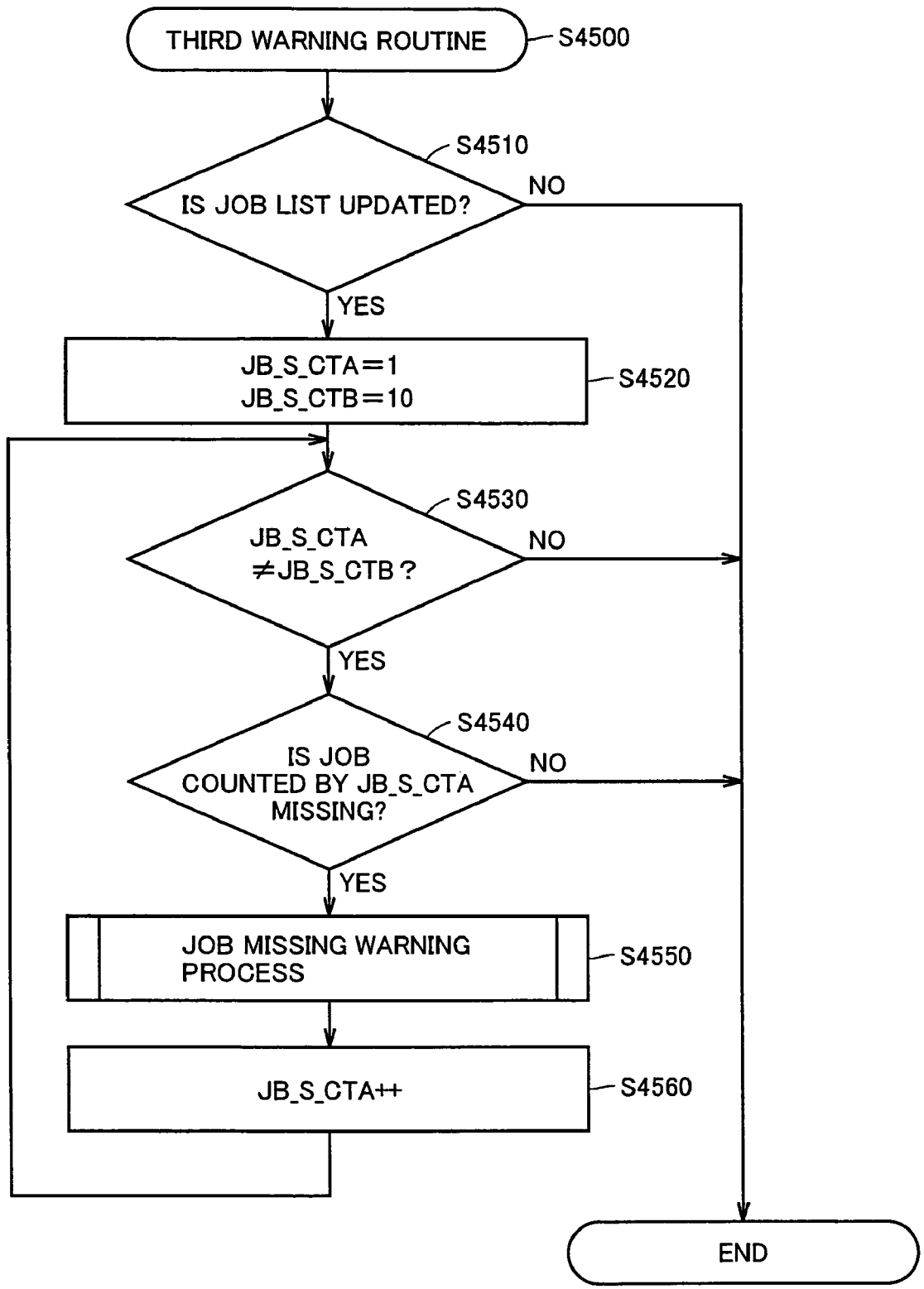
FIG. 45 is a flowchart that shows a procedure for processes executed by the printer according to the third embodiment of the present invention.

Referring to FIG. 45, a control structure of printer 200 according to this embodiment will be described. FIG. 45 is a flowchart that shows a procedure for a third warning routine executed by CPU 400.

In step S4510, CPU 400 determines whether the JOB list is updated based on the data stored in RAM 220. If CPU 40 determines that the JOB list is updated ("YES" in step S4510), the processing advances to step S4520. Otherwise ("NO" in step S4510), the process is finished.

In step S4520, CPU 400 initializes a counter used to execute the warning routine. Namely, CPU 400 sets job counter JB_S_CTA for checking JOB left on sheet exit tray 204 at "1". In addition, CPU 400 sets upper limit counter JB_S_CTB for setting an upper limit value of the counter at "10" The value "10" of upper limit counter JB_S_CTB represents the number of JOBs when CPU 400 receives the print command.

In step S4530, CPU 400 determines whether JB_S_CTA is different from JB_S_CTB. If CPU 400 determines that JB_S_CTA is different from JB_S_CTB ("YES" in step S4530), the processing advances to step S4540. Otherwise ("NO" in step S4530), the processes are finished. In step S4540, CPU 400 determines whether JOB counted by JB_S_CTA is missing based on the data stored in the respective areas in RAM 220 (see FIGS. 43 and 44). If CPU 400 determines that the JOB is missing ("YES" in step S4540), the processing advances to step S4550. Otherwise ("NO" in step S4540), the processes are finished.

In step S4550, CPU 400 executes a preset JOB missing warning process. When this process is executed, CPU 400 warns the user of presence of JOB detected to be missing. In step S4560, CPU 400 increments counter JB_S_CTA by "1". The processing is then returned to step S4530.

Figure 46:
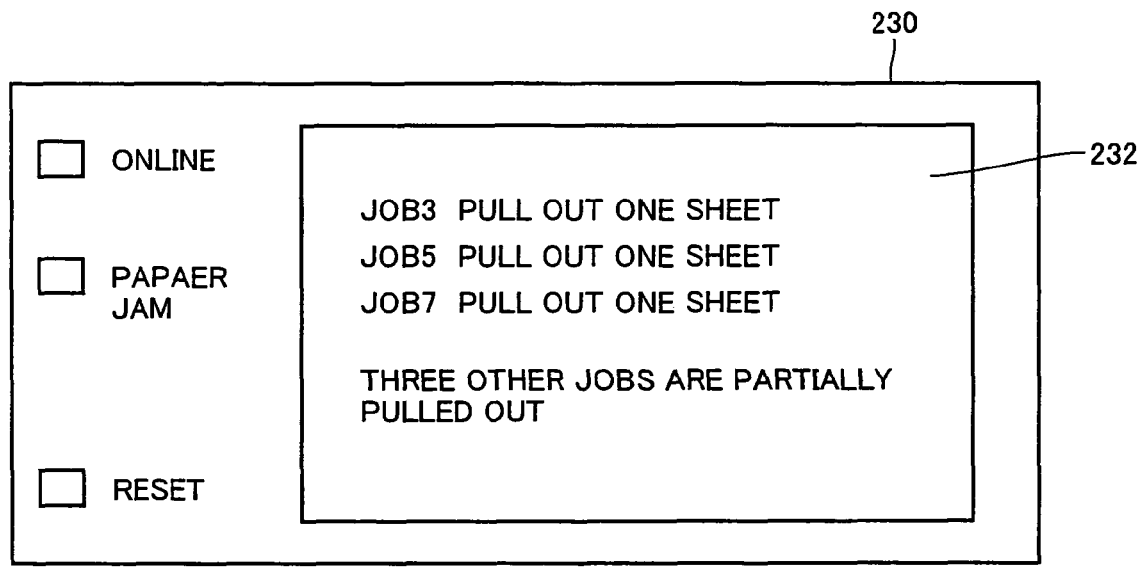
FIGS. 46 to 48 illustrate an example of a warning issued by the printer according to the second embodiment of the present invention.
Figure 47:
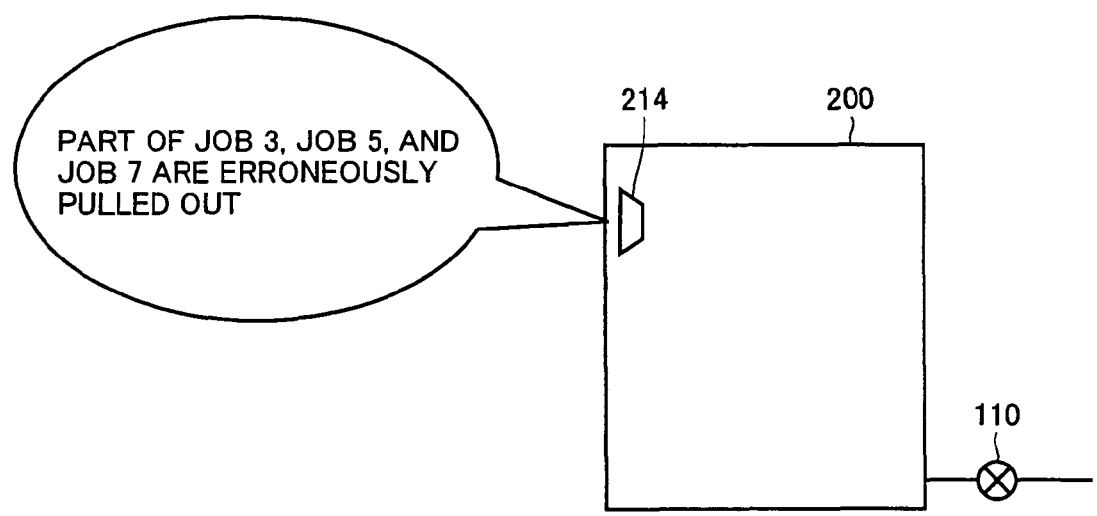
Figure 48:
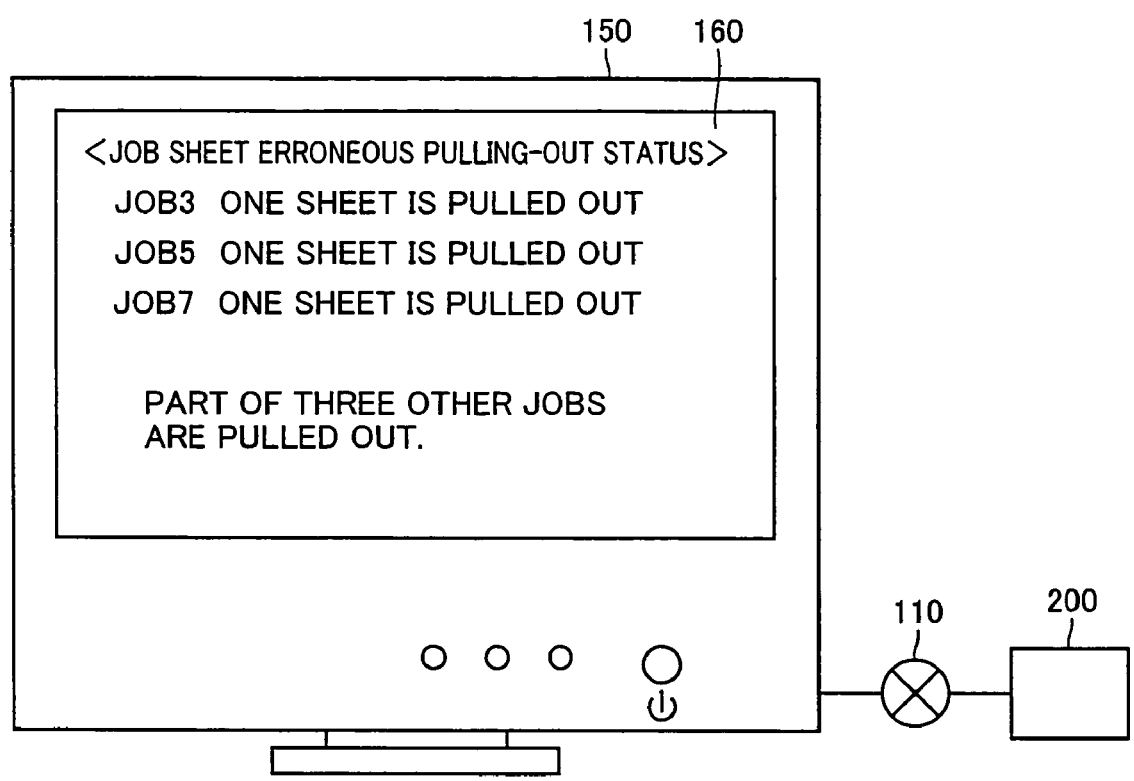

Referring to FIGS. 46 to 48, an example of display of printer 200 according to this embodiment will be described. FIG. 46 shows one example of displaying a warning message on display area in display panel 230. When CPU 400 detects that JOB on sheet exit tray 204 is missing, information for specifying the JOB and the number of pulled-out sheets is displayed. This display is realized by causing CPU 400 to store display data in a predetermined area in VRAM 212, as already described. The processes will not be repeatedly described herein in detail.

FIG. 47 illustrates an example in which printer 200 according to this embodiment issues a warning by producing a sound. Namely, when CPU 400 detects missing JOB on sheet exit tray 204, CPU 400 combines the audio data stored in area F3050 or F3060 in flash memory with the data for identifying JOB detected to be missing to thereby generate audio data, and outputs the audio data. Audio signal processing circuit 213 converts the data into an audio signal, and outputs the audio signal to loudspeaker 214. As a result, printer 200 warns the user that part of JOBs are pulled out by producing a sound as shown in FIG. 47.

FIG. 48 shows a screen for warning the user that JOB is missing, displayed on display 160 included in computer 150 connected to network 110.

Namely, when CPU 400 detects that JOB is missing, CPU 400 combines a form message for notifying the user of the missing with the data for identifying JOB detected to be missing based on data prepared in advance, and generates transmitted data. This data generation process is realized by, for example, executing the processes shown in FIG. 33. The data generated by the processes has the structure shown in, for example, FIG. 34. When the data having such a structure is transmitted from printer 200 to computer 150, i.e., the client corresponding to JOB detected to be missing, display 160 of computer 150 displays the message. The user distant from printer 200 can thereby easily know that part of JOBs are erroneously pulled out.

Fourth Embodiment

Referring to FIGS. 49 to 53, a fourth embodiment of the present invention will be described. Printer 200 according to the fourth embodiment differs from printers 200 according to the first embodiment, the first and second modifications of the first embodiment, the second embodiment, and the third embodiment by including a function of displaying a JOB list. Printer 200 according to the fourth embodiment is equal in hardware configuration and functions to printers 200 according to the respective preceding embodiments. The hardware configuration and functions of the printer according to this embodiment will not be, therefore, repeatedly described herein.

Figure 49:
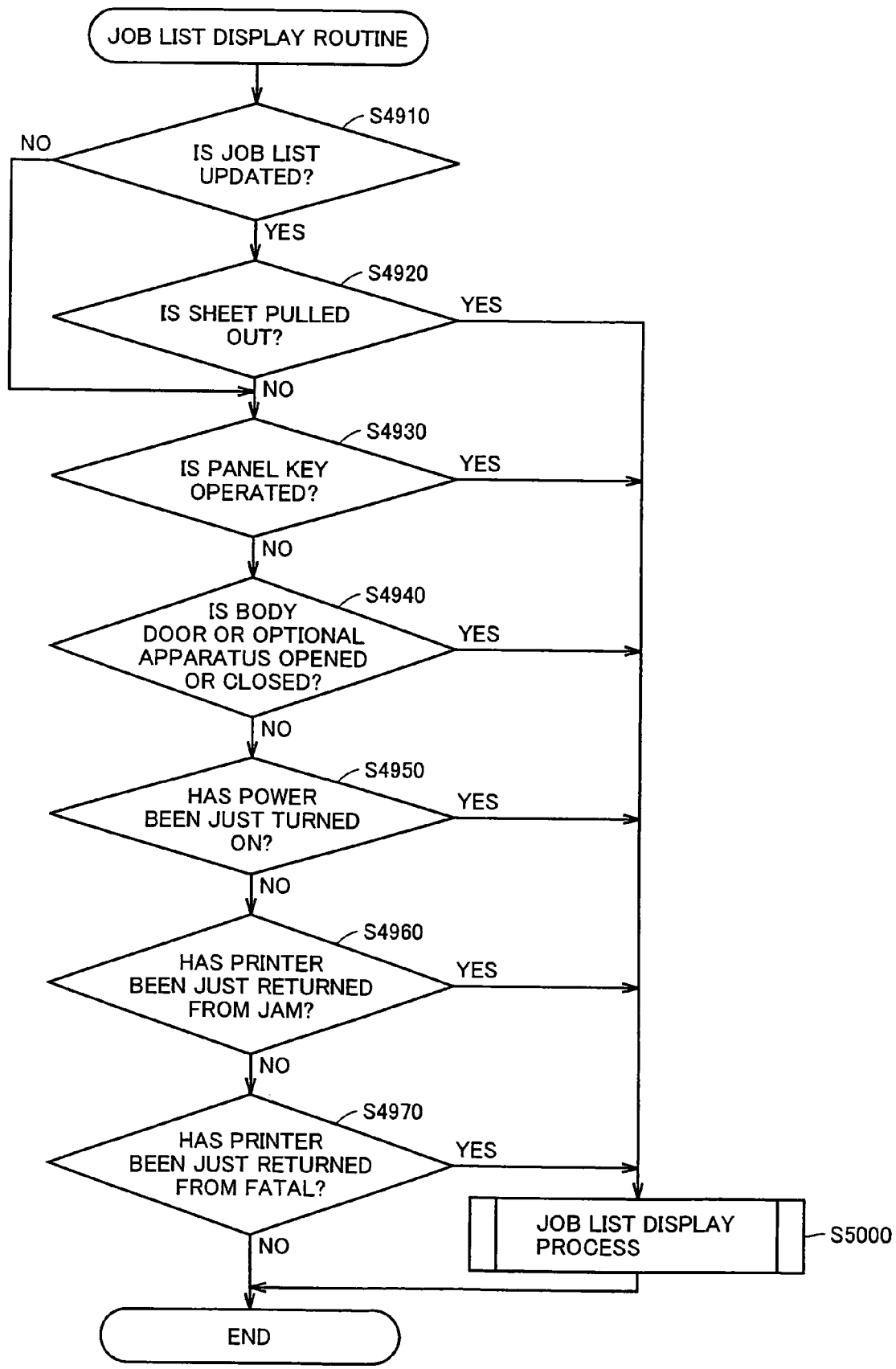
FIGS. 49 and 50 are flowcharts that show procedures for processes executed by a printer according to a fourth embodiment of the present invention.
Figure 50:
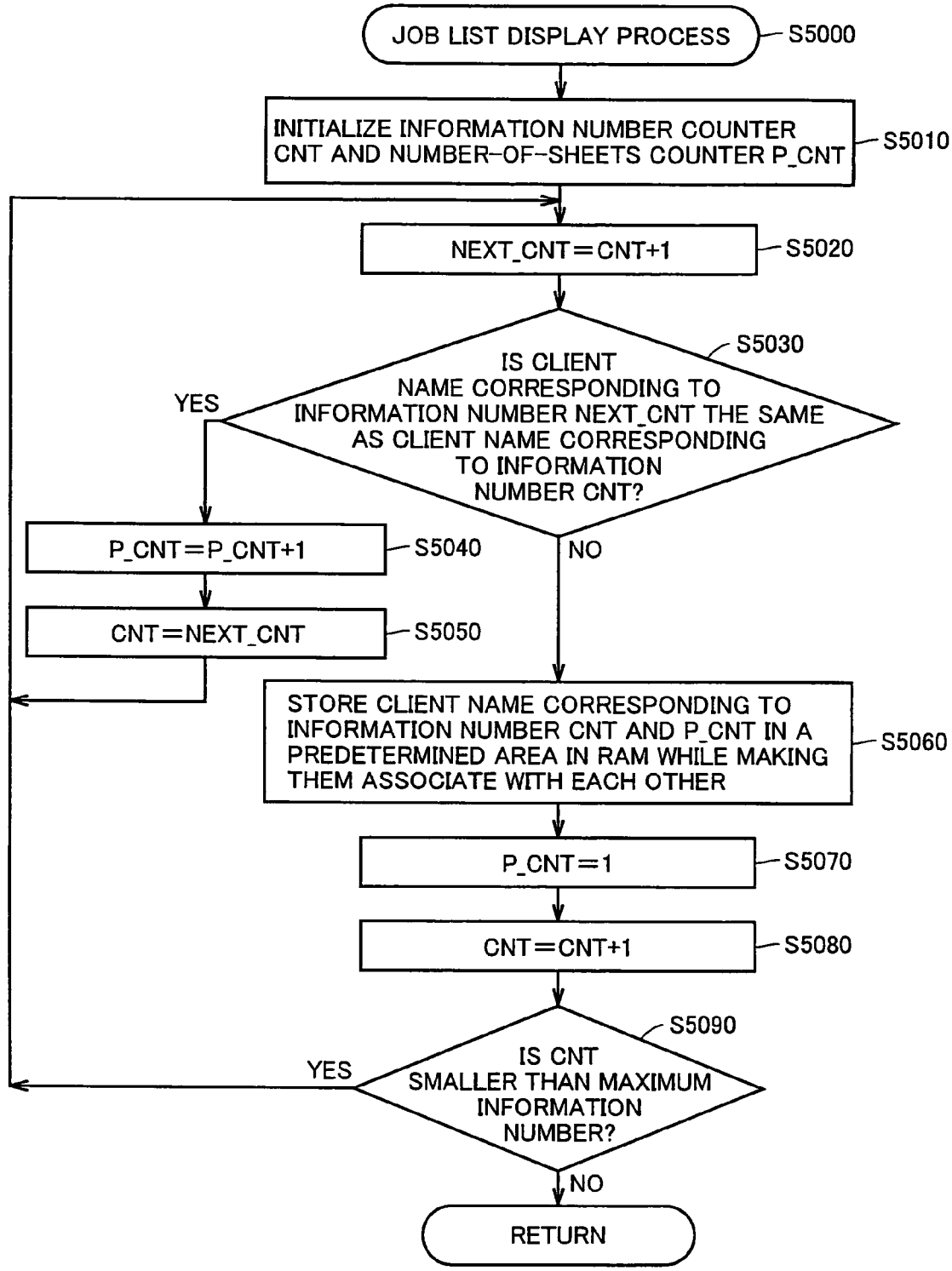

Referring to FIGS. 49 and 50, a control structure of printer 200 according to this embodiment will be described. FIG. 49 is a flowchart that shows a procedure for a JOB list display routine executed by CPU 400. FIG. 50 is a flowchart that shows a procedure for JOB list display processes (S5000) executed by CPU 400.

Referring to FIG. 49, at step S4910, CPU 400 determines whether the JOB list is updated. If CPU 400 determines that the JOB list is updated ("YES" in step S4910), the processing advances to step S4920. Otherwise ("NO" in step S4910), the processing advances to step S4930. In step S4920, CPU 400 determines whether a sheet is pulled out from sheet exit tray 204 based on information from IC tag reader 300. If CPU 400 determines that the sheet is pulled out ("YES" in step S4920), the processing advances to step S5000. Otherwise ("NO" in step S4920), the processing advances to step S4930.

In step S4930, CPU 400 determines whether a panel key is operated based on a signal from display panel 230. This determination is made based on, for example, position information detected by a pressure-sensitive panel key (not shown) provided on panel key 230. If CPU 400 determines that the panel key is operated ("YES" in step S4930), the processing advances to step S5000. Otherwise ("NO" in step S4930), the processing advances to step S4940.

In step S4940, CPU 400 determines whether the door of printer 200 or an optional apparatus is opened or closed based on a signal from the opening-closing switch (not shown) of printer 300. If CPU 400 determines that the door or the optional apparatus is opened ("YES" in step S4940), the processing advances to step S5000. Otherwise ("NO" in step S4940), the processing advances to step S4950.

In step S4950, CPU 400 determines whether the power of the body of printer 200 has been just turned on based on a signal from a power switch (not shown). If CPU 400 determines that the power has been just turned on ("YES" in step S4950), the processing advances to step S5000. Otherwise ("NO" in step S4950), the processing advances to step S4960. In step S4960, CPU 400 determines whether printer 200 is at a timing when printer 200 is returned from JAM based on signals from sheet feed unit 207 and the other units. "JAM" means herein paper jam. If CPU 400 determines that printer 200 is at the timing when printer 200 is returned from JAM ("YES" in step S4960), the processing advances to step S5000. Otherwise ("NO" in step S4960), the processing advances to step S4970.

In step S4970, CPU 400 determines whether printer 200 has just returned from "Fatal". "Fatal" means herein a serious failure occurring to printer 200, e.g., a trouble occurring to a driving system or a failure that printer 200 itself is inoperable. If CPU 400 determines that printer 200 has just returned from "Fatal" ("YES" in step S4970), the processing advances to step S5000. Otherwise ("NO" in step S4970), the process is finished.

Referring to FIG. 50, in step S5000, CPU 400 executes the JOB list display processes to be described later. When the processes are executed, the JOB list is generated. The JOB list is displayed on display panel 230 of printer 200. The JOB list may be displayed only for preset time and stop being displayed thereafter. Alternatively, the display may be stopped in response to an operation of an arbitrary button. Printer 200 can thereby switch over its display to another display, making it possible to prevent deterioration of convenience.

In step S5010, CPU 400 initializes an information number counter CNT and a number-of-sheets counter P_CNT. Namely, CPU 400 sets these counters at "1", respectively. In step S5020, CPU 400 sets a next information number counter NEXT_CNT at a value obtained by adding "1" to the value of CNT.

In step S5030, CPU 400 determines whether a client name corresponding to information number NEXT_CNT is the same as a client name corresponding to information number CNT in area F1950. If CPU 400 determines that they are the same ("YES" in step S5030), the processing advances to step S5040. Otherwise ("NO" in step S5030), the processing advances to step S5060.

In step S5040, CPU 400 increment the value of P_CNT by "1". In step S5050, CPU 400 sets the value of CNT at the value of NEXT_CNT. In step S5060, CPU 400 stores the client name corresponding to information number CNT and P_CNT in a predetermined area in RAM 220 while making them associate with each other. In step S5070, CPU 400 sets the value of P_CNT at "1". In step S5080, CPU 400 increments CNT by "1".

In step S5090, CPU 400 determines whether the value of CNT is smaller than a maximum information number. If CPU 400 determines that the value of CNT is smaller than the maximum information number ("YES" in step S5090), the processing is returned to step S5020. Otherwise ("NO" in step S5090), the processes are finished and returned to the basic routine processing.

Referring to FIGS. 51 and 52, a data structure for printer 200 according to this embodiment will be described. FIG. 51 shows an example of storing data in RAM 220. The data is data acquired by holding a communication with IC tag 700 allocated to each sheet 600 discharged to sheet exit tray 204 of printer 200. FIG. 52 shows one example of display data stored in VRAM 212 for displaying the generated JOB list. The display data is generated based on the data shown in FIG. 51.

When printer 200 discharges a sheet based on a print command, an information storage area corresponding to the discharge is secured. Each sheet is stored therein while making a client name, StartPID, and EndPID associate with one another for each PID.

Referring to FIG. 51, when printer 200 outputs sheets in response to print commands input to printer 200 in an order of clients A, B, C, D, E, A, G, H, I, and A, items of data on the clients are stored in areas F2150 to F2190 in RAM 220, respectively. Based on these items of data, the JOB list display processing is executed. For example, when IC tag reader 300 communicates with IC tag 700 allocated to each sheet 600 on sheet exit tray 204 right after all sheets 600 are discharged to sheet exit tray 204, sheet information on all sheets 600 is acquired. The items of data stored in areas F2150 to F2190 are updated based on the acquired sheet information. Thereafter, part of sheets 600 on sheet exit tray 204 are pulled out. When IC tag reader 300 communicates with each IC tag 700 after part of sheets 600 on sheet exit tray 204 are pulled out, the number of sheets 600 after the pulling out is acquired.

CPU 400 searches JOBs from information numbers "1" to "20" in this order, and calculates the number of sheets 600 left on sheet exit tray 204 for each client. For example, when the processes shown in FIG. 50 are executed, an execution result is stored in the other area in VRAM 212 as shown in FIG. 52. Namely, specified client names are stored in area F5210 respectively. The number of sheets 600 left on sheet exit tray 204 for each client is stored in area F5220.

Figure 53:
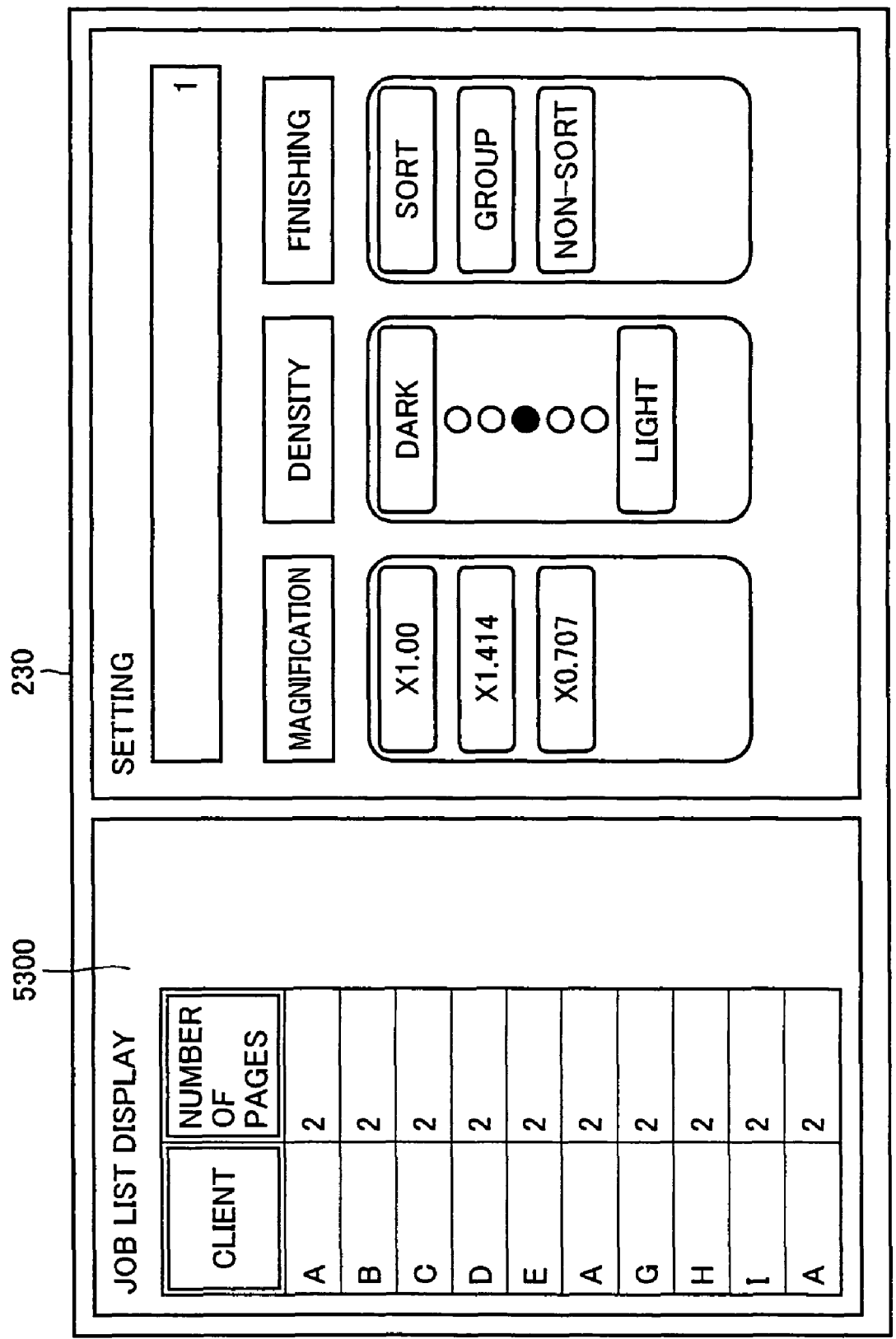
FIG. 53 shows a screen displayed by a display panel included in the printer according to the fourth embodiment of the present invention.

FIG. 53 shows a screen of display panel 230 included in printer 200 according to this embodiment.

When data generated based on the data shown in FIG. 51 s written in a predetermined area in VRAM 212, display panel 213 displays the JOB list. Namely, as shown in FIG. 53, the JOB list is displayed in an area 5300 on display panel 230 based on sheets 600 left on sheet exit tray 204 at real time. This list is updated based on information acquired by the communication between IC tag reader 300 and IC tag 700 allocated to each sheet 600 on sheet exit tray 204 held at predetermined times interval. The user can thereby easily and promptly know how many discharged sheets 600 are left on sheet exit tray 204.

Modification of Fourth Embodiment

Figure 54:
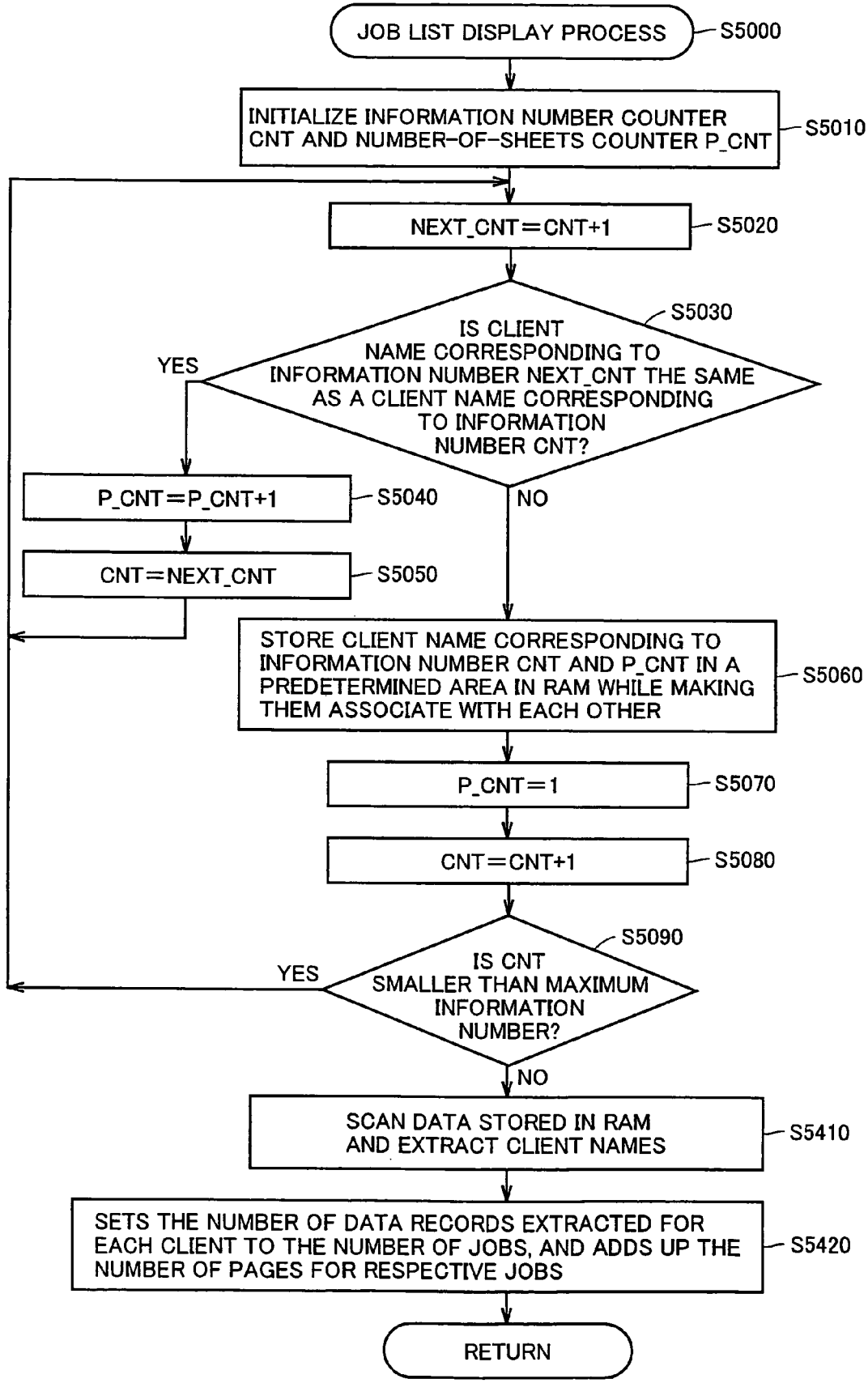
FIG. 54 is a flowchart that shows a procedure for processes executed by the printer according to the fourth embodiment of the present invention.
Figure 56:
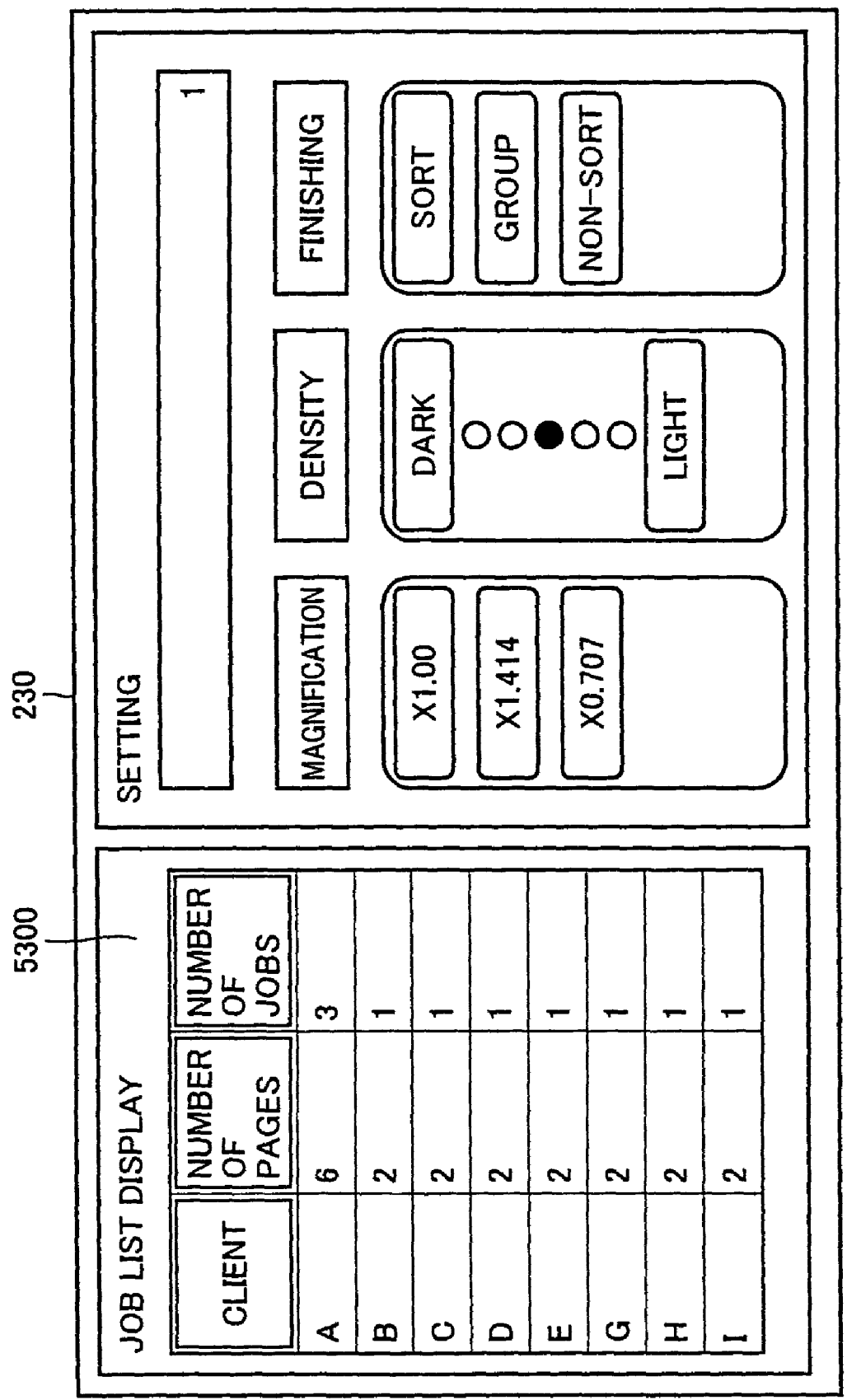
FIG. 56 shows a screen displayed by a display panel included in the printer according to the modification of the fourth embodiment of the present invention.

Referring to FIGS. 54 to 56, a modification of the fourth embodiment will be described. Printer 200 according to the modification differs from printers 200 according to the preceding embodiments by including a function of displaying the number of prints and the number of JOBs according to each client.

Printer 200 according to this modification is equal in hardware configuration and functions to printers 200 according to the preceding embodiments. The hardware configuration and the functions of printer 200 according to this modification will not be, therefore, repeatedly described herein.

Referring to FIG. 54, a control structure of printer 200 according to this modification will be described. FIG. 54 is a flowchart that shows a procedure for processes executed by printer 200 according to this modification. It is noted that the same processes as those in the preceding embodiments are denoted by the same step numbers, respectively, and that they will not be repeatedly described herein.

In step S5090, CPU 400 determines whether CNT is smaller than the maximum information number. If CPU 400 determines that CNT is smaller than the maximum information number ("YES" in step S5090), the processing is returned to step S5020. Otherwise ("NO" in step S5090), the processing advances to step 5410.

In step S5410, CPU 400 scans the data stored in RAM 220 and extracts client names. This extraction process is performed on, for example, the data shown in FIG. 52. Since the extraction process is well known, it will not be described herein. In step S5420, CPU 400 sets the number of data records extracted for each client to the number of JOBs, and adds up the number of sheet for respective JOBs. By doing so, even if a plurality of JOBs are present for a single client, the number of JOBs for the respective clients can be totalized.

Referring to FIG. 55, a data structure for printer 200 according to this modification will be described. FIG. 55 shows an example of data stored in VRAM 212. This data is written into VRAM 212 after the processing (steps S5450 and S5420) shown in FIG. 54 is executed.

Namely, in VRAM 212, respective print command target client names are stored in an area F5510. The client names stored in this area are individually provided and the same client is not stored a plurality of times. Data that represents the number of prints for each client is stored in an area F5520. The number of JOBs indicated for each client is stored in an area F5530. When such data is generated, it is possible to notify the user of each client of the total number of prints for the client. Printer 200 displays the JOB list on display panel 230 based on the data written into VRAM 212.

FIG. 56 shows a screen of display panel 230 included in printer 200 according to this modification. A JOB list for each client is displayed in display area 5300 on display panel 230.

As can be seen, printer 200 according to this modification, each user can easily grasp the number of sheets discharged in response to the print command(s) output from the user and the number of JOBs for the client.

The present invention is applicable to the image forming apparatus, e.g., a printer, a copying machine, or MFP.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   an image forming unit that forms an image on a sheet;
   a storage unit that stores identification data for identifying said sheet and a client name for identifying a client corresponding to said sheet while making the identification data and the client name associate with each other:
   a writing unit that writes said client name and said identification data in a tag allocated to said sheet, said tag including a communication unit that transmits and receives information, and an information storage unit that stores information,
   a reading unit that reads information in said tag allocated to each sheet;
   a generating unit that generates notification information for announcing an exit status of said each sheet by comparing the information read by said reading unit, to the information stored in said storage unit wherein said exit status includes a determination of a sheet having an erroneous exit status;
   a detecting unit that detects that a discharged sheet is pulled out and that a job is pulled out based on said read information and said stored information;
   a determining unit that calculates a number of pulled out sheets and a number of pulled out jobs and determines based on said calculations that a sheet has an erroneous exit status; and
   a notification unit that announces said exit status, including an erroneous exit status, based on said notification information.

2. The image forming apparatus according to claim 1, further comprising:
   an exit unit where discharged sheet are piled up; wherein
   in response to detection that the discharged sheet is pulled out, said generating unit generates warning information for warning that the discharged sheet is pulled out; and
   said notification unit announces that said sheet is pulled out based on said warning information.

3. The image forming apparatus according to claim 2, wherein
   said storage unit stores the identification data on the sheet on which said image is formed, said client name, the identification data on the sheet discharged first in a job that includes sheets continuously discharged by the same client, and the identification data on the sheet discharged last in said job while making the items of identification data and the client name associate with one another,
   said determining unit determines whether an other job corresponding to the client corresponding to said pulled-out job is left on said exit unit based on said read information in response to the detection that said pulled out job is pulled out, and
   said generating unit generates said warning information if said other job is left on said exit unit.

4. The image forming apparatus according to claim 2, wherein
- said storage unit stores the identification data on the sheet on which said image is formed, said client name, the identification data on the sheet discharged first in a job that includes sheets continuously discharged by the same client, and the identification data on the sheet discharged last in said job while making the items of identification data and the client name associate with one another,
- said detecting unit detects that each job for each of a plurality of clients is pulled out, and
- said generating unit generates said warning information if it is detected that the each job of each of said plurality of clients is pulled out.

5. The image forming apparatus according to claim 2, wherein
- said storage unit stores the identification data on the sheet on which said image is formed, said client name, the identification data on the sheet discharged first in a job that includes sheets continuously discharged by the same client, and the identification data on the sheet discharged last in said job while making the items of identification data and the client name associate with one another,
- said detecting unit detects that one of the sheets included in said job is pulled out, and
- said generating unit generates said warning information in response to detection that said one of the sheets included in said job is pulled out.

6. The image forming apparatus according to claim 2, wherein
- said warning information includes display data for displaying an image that announces said exit status, and
- said notification unit includes a display unit that displays said image based on said display data.

7. The image forming apparatus according to claim 2, further comprising:
- an input unit that accepts inputs of a print command to print the sheet issued by said client from an information processing apparatus that includes a communication unit that transmits and receives data, and a display unit that displays an image based on image data, wherein
- said warning information includes display data for displaying an image that announces said exit status on said display unit, and
- said notification unit includes an output unit that outputs said display data to said information processing apparatus.

8. The image forming apparatus according to claim 2, wherein
- said warning information includes audio data for outputting a sound that announces said exit status, and
- said notification unit includes a sound output unit that sounds based on said audio data.

9. The image forming apparatus according to claim 1, wherein
- said generating unit includes a list information generating unit that generates list information for displaying a list of jobs including sheets continuously discharged by the same client, and
- said notification unit includes a display unit that displays said list based on said list information.

10. The image forming apparatus according to claim 9, further comprising:
- an exit unit where the discharged sheets are piled up; and
- said detecting unit detects that one of the sheets is pulled out from said exit unit based on said read information and on said stored information, and
- said list information generating unit generates said list information in response to detection that the one sheet is pulled out.

11. The image forming apparatus according to claim 9, further comprising:
- an input unit that receives an input of an operation from an outside; and
- an input detecting unit that detects that said operation is input, wherein
- said list information generating unit generates said list information in response to the input of said operation.

12. The image forming apparatus according to claim 9, further comprising:
- a housing including an opening-closing unit; and
- a housing detecting unit detects that said housing is opened or closed, wherein
- said list information generating unit generates said list information in response to detection that said housing is opened or closed.

13. The image forming apparatus according to claim 9, further comprising:
- a power detecting unit that detects that a power switch is turned on, wherein said storage section is nonvolatile, and
- said list information generating unit generates said list information in response to detection that said power switch is turned on.

14. The image forming apparatus according to claim 9, further comprising:
- a formation detecting unit that detects that formation of the image on the sheet corresponding to said job is finished based on said read information and on said stored information, and
- said list information generating unit generates said list information when the formation of said image is finished.

15. The image forming apparatus according to claim 9, further comprising:
- a paper jam detecting unit that detects paper jam is solved, and
- said list information generating unit generates said list information in response to detection that said paper jam is solved.

16. The image forming apparatus according to claim 9, further comprising:
- a recovery detecting unit that detects that the image forming apparatus is recovered from its own failure, and
- said list information generating unit generates said list information in response to detection that said image forming apparatus is recovered from said failure.

17. The image forming apparatus according to claim 1, wherein said tag is the one that includes a semiconductor integrated circuit.

18. An image forming method comprising:
- forming an image on a sheet;
- storing identification data for identifying said sheet and a client name for identifying a client corresponding to said sheet while making the identification data and the client name associate with each other;
- writing said client name and said identification data in a tag allocated to said sheet, said tag including a communication unit that transmits and receives information, and an information storage unit that stores information;

reading information in said tag allocated to each sheet;

generating notification information for announcing an exit status of said each sheet by comparing the information read at said reading step, to the information stored at said storage step wherein said exit status includes a determination of a sheet having an erroneous exit status;

detecting that a discharged sheet is pulled out and that a job is pulled out based on said read information and said stored information;

calculating a number of pulled out sheets and a number of pulled out jobs and determines based on said calculations that a sheet has an erroneous exit status; and announcing said exit status, including an erroneous exit status, based on said notification information.

19. A non-transitory computer readable medium storing computer program instructions, which when executed by a computer programmed with the instructions, causes an image forming apparatus to execute the steps of:

forming an image on a sheet;

storing identification data for identifying said sheet and a client name for identifying a client corresponding to said sheet while making the identification data and the client name associate with each other;

writing said client name and said identification data in a tag allocated to said sheet, said tag including a communication unit that transmits and receives information, and an information storage unit that stores information;

reading information in said tag allocated to each sheet;

generating notification information for announcing an exit status of said each sheet by comparing the information read at said reading step, to the information stored at said storage step wherein said exit status includes a determination of a sheet having an erroneous exit status;

detecting that a discharged sheet is pulled out and that a job is pulled out based on said read information and said stored information;

calculating a number of pulled out sheets and a number of pulled out jobs and based on said calculations determining that a sheet has an erroneous exit status; and announcing said exit status, including an erroneous exit status, based on said notification information.

* * * * *